United States Patent
Goto

(10) Patent No.: US 10,336,962 B2
(45) Date of Patent: Jul. 2, 2019

(54) COMPOSITION FOR SOLID LUBRICATING COATING, THREADED CONNECTION FOR PIPE OR TUBE INCLUDING THE SOLID LUBRICATING COATING FORMED FROM THE COMPOSITION, AND METHOD OF PRODUCING THE THREADED CONNECTION

(71) Applicants: NIPPON STEEL & SUMITOMO METAL CORPORATION, Tokyo (JP); VALLOUREC OIL AND GAS FRANCE, Aulnoye-Aymeries (FR)

(72) Inventor: Kunio Goto, Kobe (JP)

(73) Assignees: NIPPON STEEL & SUMITOMO METAL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 232 days.

(21) Appl. No.: 15/126,015

(22) PCT Filed: Mar. 3, 2015

(86) PCT No.: PCT/JP2015/001112
§ 371 (c)(1),
(2) Date: Sep. 14, 2016

(87) PCT Pub. No.: WO2015/141159
PCT Pub. Date: Sep. 24, 2015

(65) Prior Publication Data
US 2018/0201868 A1    Jul. 19, 2018

(30) Foreign Application Priority Data
Mar. 20, 2014   (JP) .................................. 2014-058702

(51) Int. Cl.
  *C10M 169/04* (2006.01)
  *F16L 15/04* (2006.01)
  *F16L 15/08* (2006.01)

(52) U.S. Cl.
  CPC ......... *C10M 169/044* (2013.01); *F16L 15/04* (2013.01); *F16L 15/08* (2013.01);
  (Continued)

(58) Field of Classification Search
CPC combination set(s) only.
See application file for complete search history.

(56) References Cited

U.S. PATENT DOCUMENTS

2006/0228505 A1* 10/2006 Goto ....................... E21B 12/06
                                                                428/36.9
2013/0277961 A1* 10/2013 Goto .................. C10M 169/041
                                                                  285/94

FOREIGN PATENT DOCUMENTS

JP    2003-074763    3/2003
JP    2006-526747    11/2006
(Continued)

*Primary Examiner* — Ellen M McAvoy
*Assistant Examiner* — Chantel L Graham
(74) *Attorney, Agent, or Firm* — Clark & Brody

(57) ABSTRACT

This invention provides a threaded connection for pipe or tube that has a non-sticky surface and that suppresses the occurrence of rust and exhibits excellent galling resistance and airtightness even in an extremely low temperature environment without using compound grease, a method of producing the same, and a composition for forming a solid lubricating coating on the threaded connection. A solid lubricating coating (24) formed from a composition containing a binder, a fluorine addition agent, a solid lubricant and a rust proof addition agent is coated as a topmost surface treatment coating on a contact surface of at least one of a pin and a box. Even when exposed to an extremely low temperature environment, the solid lubricating coating (24) can
(Continued)

maintain adhesiveness and exhibit a lubricating function, can suppress the occurrence of galling of a threaded connection, and can also secure airtightness after fastening.

23 Claims, 9 Drawing Sheets

(52) U.S. Cl.
CPC . *C10M 2201/085* (2013.01); *C10M 2201/105* (2013.01); *C10M 2201/1033* (2013.01); *C10M 2205/143* (2013.01); *C10M 2209/0625* (2013.01); *C10M 2213/00* (2013.01); *C10M 2213/003* (2013.01); *C10N 2210/01* (2013.01); *C10N 2210/03* (2013.01); *C10N 2230/06* (2013.01); *C10N 2230/08* (2013.01); *C10N 2230/12* (2013.01); *C10N 2240/22* (2013.01); *C10N 2250/08* (2013.01)

(56) References Cited

FOREIGN PATENT DOCUMENTS

| | | |
|---|---|---|
| WO | 2006/104251 | 10/2006 |
| WO | 2007/042231 | 4/2007 |
| WO | 2009/072486 | 6/2009 |

* cited by examiner

Torque Chart At Time Of Tightening

COMPOSITION FOR SOLID LUBRICATING COATING, THREADED CONNECTION FOR PIPE OR TUBE INCLUDING THE SOLID LUBRICATING COATING FORMED FROM THE COMPOSITION, AND METHOD OF PRODUCING THE THREADED CONNECTION

TECHNICAL FIELD

The present invention relates to a composition for forming a solid lubricating coating used for surface treatment of threaded connections for pipes or tubes that are used for connecting steel pipes, particularly oil well pipes, a threaded connection for pipe of tube including a solid lubricating coating formed from the composition, and a method of producing the threaded connection.

BACKGROUND ART

Oil well pipes such as tubing which a fluid such as crude oil flows inside or casing which is surrounding the tubing are used in the drilling of oil wells for extraction of crude oil or gas oil. The oil well pipes are normally connected (fastened) to each other using threaded connections. In the past, the depth of oil wells was between 2,000 and 3,000 meters. However, in deep oil wells such as offshore oil fields of recent years, the depth may sometimes reach 8,000 to 10,000 meters. The length of an individual oil well pipe is typically ten-odd meters. Hence, in some cases a huge enormous number of 1000 oil well pipes or more are connected together.

In their usage environment, threaded connections for oil well pipes are subjected to loads such as axial tensile forces caused by the weight of the oil well pipes and the connections themselves, compounded pressure of internal and external interfacial pressure and the like, and geothermal heat. Therefore, the threaded connections for pipes or tubes need to be able to maintain airtightness without being damaged even in such a severe environment.

A pin-box structure constituted by a portion referred to as a pin that has an external thread and a portion referred to as a box that has an internal thread as described, for example, in Patent Literature 1 may be mentioned as a typical threaded connection for pipe or tube that is used to fasten oil well pipes. Typically, a pin is formed on both end portions of an oil well pipe, and a box is formed on the inner surface of both sides of a threaded connection component referred to as coupling.

During the process of lowering tubing or casing into an oil well, due to various reasons such as trouble arising, a threaded connection which was previously tightened is sometimes loosened, the threaded connection is temporarily lifted up from the oil well, and thereafter retightened and lowered into the well again. According to the API (American Petroleum Institute) standards, it is desirable that there is no occurrence of unrepairable seizing referred to as galling and for airtightness to be maintained even if tightening (make-up) and loosening (breakout) are performed ten times for a connection for tubing or three times for a connection for casing.

In order to increase galling resistance and airtightness when tightening threaded connections for oil well pipes, a lubricant referred to as compound grease is applied to contact surfaces of the threaded connections (that is, to thread parts and unthreaded metal contact parts). The term compound grease refers to a viscous liquid lubricant (a greasy lubricant) which contains heavy metal powders. An example of compound grease is prescribed in API BUL 5A2.

In the past, it has been proposed to carry out surface treatment to form one or more layers on the contact surfaces of threaded connections to increase the retentivity with respect to compound grease and improve sliding properties. Examples of such surface treatment include nitriding, various types of plating including zinc plating and dispersion plating, and phosphate chemical treatment.

Compound grease contains a large amount of heavy metal powders such as zinc, lead, and copper. Hence it is pointed out that there is the possibility that a heavy metal will affect the use environment, for example, the marine environment, and the working environment.

In recent years, strict environmental restrictions are being enacted on a global scale. The use of compound grease is also already being restricted in some regions. Accordingly, to avoid effects on the environment and humans during work to drill gas wells and oil wells, a demand has developed for threaded connections which exhibit excellent galling resistance without using compound grease.

The present applicants proposed a threaded connection for pipe or tube that can be used for fastening oil well pipes without the application of compound grease in Patent Literature 2. In the threaded connection disclosed in Patent Literature 2, a contact surface of at least one of a pin and a box is coated with a two-layer coating consisting of a viscous liquid or semisolid lubricating coating and a dry solid coating formed thereon. The dry solid coating is formed from a thermosetting resin coating such as an acrylic resin or an ultraviolet curing resin coating. The viscous liquid or semisolid lubricating coating is tacky and consequently foreign matter easily adheres thereto. However, the tackiness is eliminated by forming the dry solid coating on the viscous liquid or semisolid lubricating coating. Since the dry solid coating is broken at the time of fastening a threaded connection, the dry solid coating does not impair the lubricity of the lubricating coating formed thereunder.

Further, in Patent Literature 3, the present applicants proposed a threaded connection in which a thin non-sticky lubricating coating is formed on thread parts (a pin and a box). The lubricating coating described in Patent Literature 3 is obtained by dispersing solid lubricant particles in a solid matrix exhibiting plastic or viscoplastic rheological behavior (flow properties). The fusing point of the solid matrix is preferably in the range of 80 to 320° C. The lubricating coating is formed by spray coating in a molten state (hot melt spraying), by flame spraying using a powder, or by spray coating of an aqueous emulsion. A composition used in the hot melt spraying contains, for example, polyethylene as a thermoplastic polymer, wax (for example, carnauba wax) and a metal soap (such as zinc stearate) as a lubricant component, and calcium sulfonate as a corrosion inhibitor.

Still further, in Patent Literature 4, the present applicants proposed a threaded connection for pipe or tube in which a solid anticorrosive coating is formed on a contact surface of a pin, and a solid lubricating coating is provided on a contact surface of a box. The solid anticorrosive coating includes an ultraviolet curing resin as a main ingredient, and preferably is transparent. The solid lubricating coating is preferably formed by hot melt spraying from a composition containing a thermoplastic polymer, wax, a metal soap, a corrosion inhibitor, a water-insoluble liquid resin and a solid lubricant, and exhibits plastic or viscoplastic rheological behavior.

CITATION LIST

Patent Literature

Patent Literature 1: JP2006-526747A
Patent Literature 2: International Application Publication No. WO 2006/104251

Patent Literature 3: International Application Publication No. WO 2007/042231

Patent Literature 4: International Application Publication No. WO 2009/072486

SUMMARY OF INVENTION

Technical Problem

In the threaded connections disclosed in the aforementioned Patent Literatures 2 to 4, because of the excellent adhesiveness and lubricating performance of the solid lubricating coating in cold to warm environments of around −10° C. to +50° C., the galling resistance of the threaded connection is sufficient. However, when exposed to an extremely low temperature environment of −60° C. to −20° C., peeling of the solid lubricating coating that is caused by a decrease in adhesiveness and cracking due to embrittlement of the coating easily occur. Therefore, the galling resistance becomes inadequate. In addition, when work to tighten and loosen a threaded connection is carried out under an extremely low temperature environment, the torque needs to be extremely high.

An object of the present invention is to provide a composition for forming a solid lubricating coating used for a surface treatment of a threaded connection for pipe or tube which does not have a sticky surface that suppresses the occurrence of rust and exhibits excellent galling resistance and airtightness without using compound grease even when connecting pipes, especially oil well pipes, in an extremely low temperature environment, a threaded connection for pipe or tube including a solid lubricating coating formed from the composition, and a method of producing the threaded connection.

Solution to Problem

A composition according to the present embodiment is a composition for forming a solid lubricating coating on a threaded connection for pipe or tube. The aforementioned composition consists of: a binder, a fluorine addition agent, a solid lubricant, and a rust proof addition agent. The binder contains an ethylene-vinyl acetate resin, a polyolefin resin, and a wax having a fusing point of 110° C. or less. A ratio of a mass of the ethylene-vinyl acetate resin to a mass of the polyolefin resin is from 1.0 to 1.8. A ratio of a total mass of the polyolefin resin and the ethylene-vinyl acetate resin to a mass of the wax is from 0.7 to 1.6.

A threaded connection for pipe or tube according to the present embodiment includes a pin and a box. Each of the pin and the box has a contact surface that includes a mutually contacting portion. The aforementioned solid lubricating coating is formed on the contact surface of at least one of the pin and the box of the threaded connection.

A method of producing a threaded connection for pipe or tube according to the present embodiment includes a step of applying the aforementioned composition onto the contact surface to form the solid lubricating coating.

A threaded connection for pipe or tube having the solid lubricating coating that is formed using the above described composition suppresses the occurrence of rust and exhibits excellent galling resistance and airtightness even in an extremely low temperature environment without the use of compound grease, and has a non-sticky surface.

DESCRIPTION OF EMBODIMENTS

Figure 1:
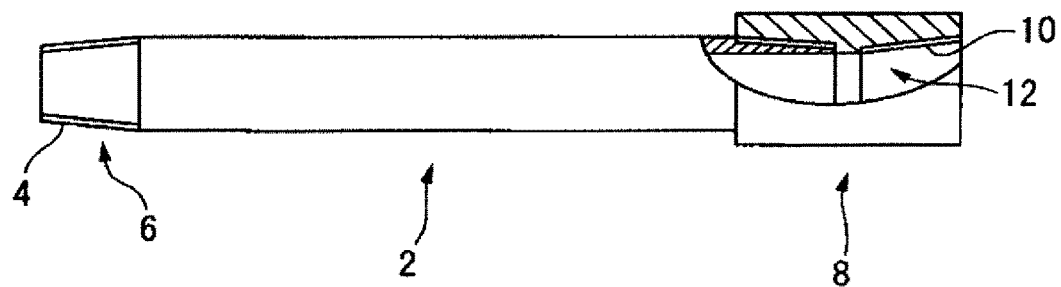
FIG. 1 is a configuration diagram illustrating one example of a threaded connection for pipe or tube of the present embodiment.

As a result of studies aimed at realizing a threaded connection which includes sufficient galling resistance, rust preventing properties, and airtightness without an extreme increase in the fastening and loosening torques of a threaded connection even when the threaded connection is used not just in cold, warm, and tropical regions where the air temperature is from around −20° C. to +50° C. but also in extremely cold regions where the air temperature is from −60° C. to −20° C., the inventors of the present application obtained the following findings.

In a solid lubricating coating formed on a threaded connection for pipe or tube, and in a composition for forming the solid lubricating coating (composition for forming a solid lubricating coating), by:

(1) mixing an ethylene-vinyl acetate (EVA) resin, a polyolefin resin, and a wax having a fusing point of 110° C. or less at a specific ratio as a binder of the composition;

(2) mixing in a fluorine addition agent at a specific ratio; and (3) further adding a solid lubricant powder and a rust proof addition agent, a high adhesiveness can be maintained even when exposed to an extremely low temperature. Hence, the threaded connection has sufficient galling resistance and airtightness, and an increase in required torque is suppressed when fastening and loosening the threaded connections under a low temperature. Furthermore, by:

(4) mixing in talc having a specific particle size at a specific ratio, torque adjustment at the time of fastening can be facilitated.

The composition of the present embodiment that was completed based on the above findings is a composition for forming a solid lubricating coating on a threaded connection for pipe or tube. The composition consists of a binder, a fluorine addition agent, a solid lubricant, and a rust proof addition agent. The binder contains an ethylene-vinyl acetate resin, a polyolefin resin, and a wax having a fusing point of 110° C. or less. A ratio of a mass of the ethylene-vinyl acetate resin to a mass of the polyolefin resin is from 1.0 to 1.8. A ratio of a total mass of the polyolefin resin and the ethylene-vinyl acetate resin to a mass of the wax is from 0.7 to 1.6.

According to the composition of the present embodiment, a thermoplastic solid lubricating coating having excellent galling resistance can be formed on a contact surface of a threaded connection for pipe or tube without the use of compound grease. The solid lubricating coating exhibits excellent performance even in an extremely low temperature environment of −60° C. to −20° C. Thus, the solid lubricating coating exhibits the same excellent galling resistance, airtightness, and rust preventing properties as those obtained when using compound grease. In addition, an increase in required torque is suppressed when fastening and loosening the threaded connections.

Preferably, the aforementioned composition contains 60 to 80% by mass of the binder, 8 to 18% by mass of the fluorine addition agent, 5 to 15% by mass of the solid lubricant, and 2 to 10% by mass of the rust proof addition agent.

The aforementioned composition may further contain 2 to 15% by mass of talc.

In this case, a difference between a yield torque and a shouldering torque can be enlarged, and as a result a torque adjustment when fastening can be facilitated.

The particle size of the talc of the aforementioned composition is, for example, from 1 to 12 µm, and a specific surface area of the talc is from 4 to 12 m$^2$/g.

The threaded connection according to the present embodiments includes a pin and a box. Each of the pin and the box has a contact surface that includes a mutually contacting portion. A solid lubricating coating is formed on the contact surface of at least one of the pin and the box of the threaded connection. The solid lubricating coating contains a binder, a fluorine addition agent, a solid lubricant and a rust proof addition agent. The binder contains an ethylene-vinyl acetate resin, a polyolefin resin, and a wax having a fusing point of 110° C. or less. A ratio of a mass of the ethylene-vinyl acetate resin to a mass of the polyolefin resin is from 1.0 to 1.8. A ratio of a total mass of the polyolefin resin and the ethylene-vinyl acetate resin to a mass of the wax is from 0.7 to 1.6.

Because the threaded connection according to the present embodiments includes the aforementioned solid lubricating coating, the threaded connection can be used without applying compound grease, and a high adhesiveness can be maintained even when the threaded connection is exposed to an extremely low temperature environment. Consequently, the threaded connection exhibits excellent galling resistance, airtightness and rust preventing properties. Accordingly, the threaded connection is particularly useful for use in oil well drilling in extremely cold regions.

In the aforementioned threaded connection, for example, the solid lubricating coating contains 60 to 80% by mass of the binder, 8 to 18% by mass of the fluorine addition agent, 5 to 15% by mass of the solid lubricant, and 2 to 10% by mass of the rust proof addition agent.

In the aforementioned threaded connection, the solid lubricating coating may further contain 2 to 15% by mass of talc.

In a case where the aforementioned solid lubricating coating included in the threaded connection according to the present embodiments contains talc, a difference between a yield torque and a shouldering torque can be enlarged, and as a result a torque adjustment when fastening the threaded connection can be facilitated.

In a case where the solid lubricating coating contains talc, the particle size of the talc is, for example, from 1 to 12 µm, and a specific surface area of the talc is from 4 to 12 m$^2$/g.

Preferably, the aforementioned threaded connection further includes a solid anticorrosive coating containing an ultraviolet curing resin. The aforementioned solid lubricating coating is formed on the contact surface of one of the pin and the box. The solid anticorrosive coating is formed on the contact surface of the other of the pin and the box.

A thickness of the aforementioned solid anticorrosive coating is, for example, 5 to 50 µm.

A thickness of the aforementioned solid lubricating coating is, for example, 10 to 200 µm.

Preferably, the aforementioned threaded connection is used in an oil well pipe.

A method of producing the threaded connection of the present embodiment is a method of producing a threaded connection for pipe or tube having a pin and a box. Each of the pin and the box has a contact surface that includes a mutually contacting portion. The method of producing the threaded connection of the present embodiment includes a step of applying the aforementioned composition onto the contact surface of at least one of the pin and the box to form the aforementioned solid lubricating coating thereon.

Preferably, the aforementioned method of producing the threaded connection includes a step of forming the aforementioned solid lubricating coating on a contact surface of one of the pin and the box. The aforementioned method of producing the threaded connection further includes a step of applying a composition for the aforementioned solid anticorrosive coating containing the ultraviolet curing resin onto the contact surface of the other of the pin and the box. The aforementioned method of producing the threaded connection further includes a step of irradiating ultraviolet rays onto the composition for the solid anticorrosive coating to form the aforementioned solid anticorrosive coating.

Hereunder, with respect to the threaded connection according to the present embodiment, an embodiment thereof will be described more specifically for the purpose of exemplification. In this case, a threaded connection of a steel pipe for an oil well pipe will be described as a preferred embodiment. However, the present invention is not particularly limited to this embodiment and can also be applied, for example, to a threaded connection used for pipes that are used other than oil well pipes.

FIG. 1 is a configuration diagram illustrating an example of a threaded connection for pipe or tube of the present embodiment. The threaded connection includes a steel pipe 2 and a coupling 8. A pin 6 having an external thread part 4 is formed on an outer surface at both ends of the steel pipe 2. A box 12 having an internal thread part 10 is formed on an inner surface on both sides of the coupling 8. The coupling 8 is previously attached with a screw at one end of the steel pipe 2. Although not illustrated in the drawing, a protector (not illustrated in the drawings) for protecting the respective thread parts is mounted before shipment to the pin 6 (on the left side in the example in the drawing) of the steel pipe 2 to which another member is not mounted and the box 12 (on the right side in the example in the drawing) of the coupling 8.

In a typical threaded connection for pipe or tube, the pin 6 is formed on the outer surface at both ends of the steel pipe 2, and the box 12 is formed on the inner surface of the coupling 8, as in the coupling-type threaded connection shown in FIG. 1. However, there also exist integral-type threaded connections which do not use a coupling and in which one end of a steel pipe is formed in a pin shape and the other end is formed in a box shape. The threaded connection of the present embodiment can be applied to either of the coupling-type and the integral-type threaded connections.

Figure 2:
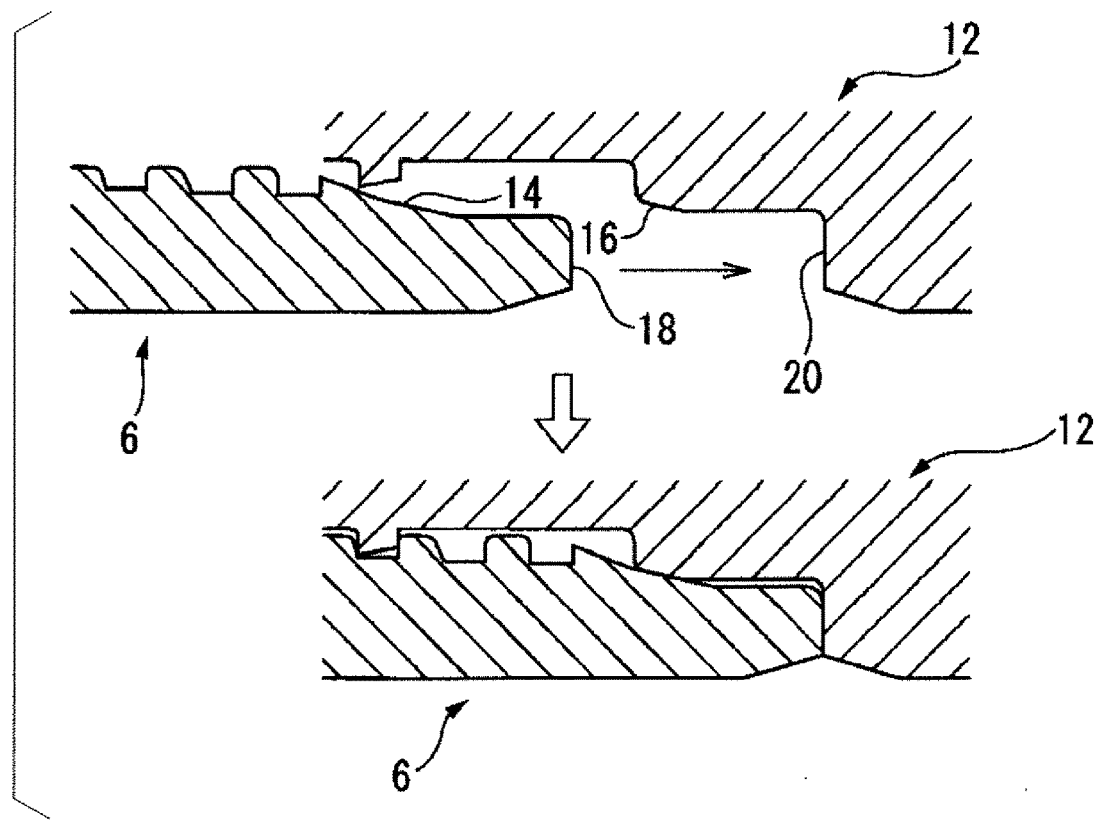
FIG. 2 is a view illustrating an example of a tightening part of a threaded connection for pipe or tube, which is a cross-sectional view illustrating unthreaded metal contact parts (shoulder parts and seal parts) of a special threaded connection.

FIG. 2 is a cross-sectional view illustrating an example of a tightening part of a threaded connection for pipe or tube. Seal parts 14 and 16 are formed on an outer peripheral surface in the vicinity of an end face on a front end side relative to the external thread of the pin 6 and on an inner peripheral surface of a base part of the internal thread of the box 12, respectively. Shoulder parts (also referred to as "torque shoulders") 18 and 20 are formed at the end face of the front end of the pin 6 and on a surface of a rearmost part of the box 12 that corresponds to the end face of the front end of the pin 6, respectively. The seal part and shoulder part constitute a metal contact part (a so-called unthreaded metal contact part) that does not have a screw in the threaded connection. The metal contact part and the thread part at which the pin 6 and the box 12 contact each other constitute contact surfaces of the threaded connection. When the pin 6 is inserted into the box 12 and the external thread and internal thread are tightened, the shoulder parts 18 and 20 of the pin 6 and the box 12 butt against each other. A torque at this time is referred to as shouldering torque. When the external thread and internal thread are tightened until interfering with each other with a suitable torque, the seal parts 14 and 16 of the pin 6 and the box 12 intimately contact each other and form a metal-to-metal seal, and the airtightness of the threaded connection is thereby secured. The torque at this time is referred to as fastening torque. If the external thread and internal thread are tightened further, the metal constituting at least one of the pin 6 and the box 12 starts to undergo a plastic deformation. The torque at this time is referred to as yield torque. If the external thread and the internal thread are tightened with a torque that is greater than the yield torque, the airtightness of the threaded connection sometimes declines. The fastening torque is set to a torque that is greater than the shouldering torque and less than the yield torque. Thus, when the difference of the yield torque and the shouldering torque is large, the fastening torque is adjusted easily.

As described above, in each of the pin 6 and the box 12, a thread part, a seal part and a shoulder part correspond to a contact surface of a threaded connection. These contact surfaces are required to have galling resistance, airtightness, and an anticorrosive property. Conventionally, compound grease containing a heavy metal powder was applied on the contact surfaces. However, concerns have arisen with regard to the influence of heavy metals on humans and the environment, and threaded connections having a solid lubricating coating that can be used for fastening oil well pipes without applying compound grease have been studied. A solid lubricating coating is typically a resin coating containing a solid lubricant.

However, with the conventional solid lubricating coating, there has been the problem that cracking occurs due to embrittlement and deterioration of the coating itself if exposed even once to an extremely low temperature environment of −60° C. to −20° C. In addition, with the conventional solid lubricating coating, there has been the problem that, depending on a difference in the coefficient of thermal expansion with respect to the base metal (steel), the adhesiveness of the coating decreases when returned to the vicinity of normal temperature and the coating easily peels off.

In the case of using the threaded connection in an extremely low temperature environment of −60° C. to −20° C., the fastening (make-up) torque increases. Consequently, in some cases the metal contact parts for securing airtightness do not completely engaged and do not contact against each other with a predetermined interfacial pressure (a state referred to as high shoulder). Even if fastening is achieved, it is easier to occur the galling during the fastening, the loosening (breakout) torque when loosening the screws becomes extremely high. In addition, when tongs used for fastening the pin and the box have a low capacity, there is also the possibility that it will not be possible to perform fastening due to insufficient torque.

Figure 3A:
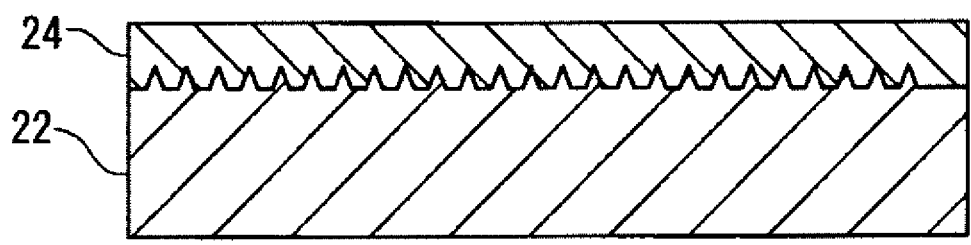
FIG. 3A is a cross-sectional view of the vicinity of a contact surface in a case where a contact surface of a threaded connection for pipe or tube was itself roughened.
Figure 3B:
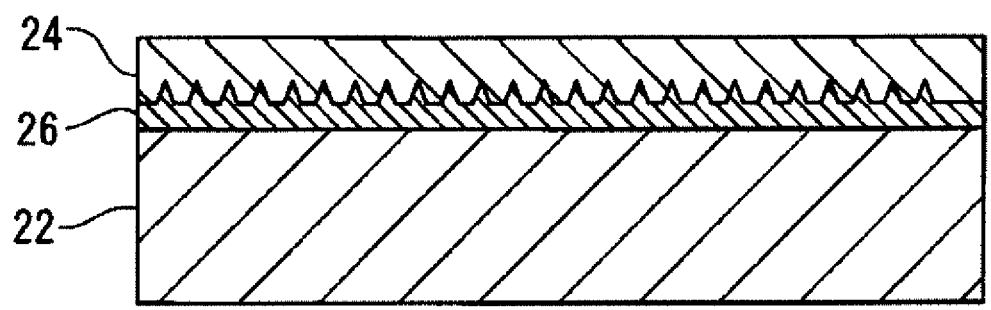
FIG. 3B is a cross-sectional view of the vicinity of a contact surface in a case where a preconditioning treatment coating for surface roughening was formed on a contact surface of a threaded connection for pipe or tube.

FIG. 3A and FIG. 3B are cross-sectional views of the vicinity of a contact surface of the threaded connection of a steel pipe of the present embodiment. At a contact surface of at least one of the pin and the box, the surface of a steel pipe 22 constituting the relevant member is covered by a solid lubricating coating 24 formed by a composition that is described later. The solid lubricating coating 24 can maintain adhesiveness even when exposed to an extremely low temperature environment of −60° C. to −20° C. The solid lubricating coating 24 also imparts lubricity to the threaded connection. Consequently, galling of the threaded connection can be prevented while preventing an increase in torque at the time of fastening and loosening, and airtightness after fastening can also be secured.

It is sufficient for the solid lubricating coating 24 to be included in a coating on the surface of the steel pipe 22. For example, as shown in FIG. 3A, the solid lubricating coating 24 may be formed so as to directly contact the surface of the steel pipe 22. As shown in FIG. 3B, the solid lubricating coating 24 may also be included in a coating that is formed on the steel pipe surface, even though the solid lubricating coating 24 is not formed in direct contact with the surface of the steel pipe 22. It is desirable for the solid lubricating coating 24 to be disposed on the topmost surface of the coating on the surface of the steel pipe 22. However, the location at which the solid lubricating coating 24 is disposed is not particularly limited and, for example, a rust-preventing agent or a coating agent for preventing scratches or the like may be applied on the topmost surface of a coating that includes the solid lubricating coating 24. Hereunder, a case where the solid lubricating coating 24 is formed directly on a contact surface of the steel pipe 22 is described as an example.

Note that, preferably a boundary surface between the solid lubricating coating 24 and the steel pipe 22 (that is, a contact surface of the steel pipe 22) is made a roughened surface. As shown in FIG. 3A, such surface roughening can be achieved by directly roughening the surface of the steel pipe 22 by performing a blasting treatment or pickling. As shown in FIG. 3B, surface roughening can be achieved by forming a preconditioning treatment coating that makes the surface rough (for example, a phosphate coating or a porous zinc (alloy) plating coating) 26 on the surface of the steel pipe 22 before forming the lubricating coating 24.

The solid lubricating coating 24 is formed, for example, by the following method. First, a composition for forming a thermoplastic solid lubricating coating is prepared. The aforementioned composition is melted at a predetermined temperature and is then applied onto the contact surface by a suitable method such as spraying, brush application, atomization and immersion. After application, the composition is hardened by known cooling means such as air cooling or allowing to cool to thereby form the solid lubricating coating 24.

A solid lubricating coating may be formed on the contact surfaces of both a pin and a box. Further, as shown in FIG.

1, at a location where a pin and a box are fastened to each other at the time of shipment, it is sufficient to form a solid lubricating coating on the contact surface of only one of the pin and the box. In this case, it is easier to perform work to apply a coat for preconditioning treatment or to form a lubricating coating on the coupling that is a short member than on the steel pipe that is a long member. Therefore, normally it is preferable to form the lubricating coating on a contact surface of the coupling in other words, the contact surface of a box.

At a location where a pin and a box are not fastened to each other at the time of shipment, the solid lubricating coating may be formed on the contact surfaces of both the pin and the box, to thereby impart both rust preventing properties and lubricity thereto. Alternatively, the solid lubricating coating may be formed on the contact surface of only one of the pin and the box (for example, the box), and a solid anticorrosive coating may be formed on the other contact surface (for example, the pin). In both cases, galling resistance, airtightness and rust preventing properties can be imparted to the threaded connection. The solid anticorrosive coating is preferably an ultraviolet curing-type coating. Further, the solid anticorrosive coating is preferably formed after performing preconditioning treatment for surface roughening.

Preferably the solid lubricating coating covers the entire contact surface of at least one of the pin and the box. However, the solid lubricating coating may cover only one part of the contact surface (for example, only a seal part).

[Solid Lubricating Coating]

As described above, according to the present embodiment a solid lubricating coating is formed on the contact surface of at least one of the pin and box that constitute the threaded connection. The solid lubricating coating is required to maintain adhesiveness even when exposed to an extremely low temperature (−60° C. to −20° C.). Further, the solid lubricating coating is required to be formed so that when fastening steel pipes together by means of a threaded connection, not only in cold, warm, and tropical regions (−20° C. to +50° C.), but also in an extremely low temperature region (−60° C. to −20° C.), a situation does not arise in which the fastening torque becomes high and a high shoulder state occurs or in which the loosening torque becomes high, so that the solid lubricating coating can thereby suppress the occurrence of galling. Furthermore, the solid lubricating coating is required to prevent rusting during storage. In a case where the adhesive strength (hardness) of a solid lubricating coating changes significantly between an environment in the vicinity of normal temperature and an extremely low temperature environment, cracks arise in the solid lubricating coating in the extremely low temperature environment and peeling of the solid lubricating coating occurs when the temperature environment returns to the vicinity of normal temperature. Therefore, the solid lubricating coating is additionally required to be formed so that the adhesive strength (hardness) of the solid lubricating coating does not change significantly between an environment in the vicinity of normal temperature and an extremely low temperature environment.

A composition for forming the solid lubricating coating of the present embodiment is a base material of the coating. The composition contains a hinder that exhibits high adhesiveness from normal temperature to an extremely low temperature, a fluorine addition agent for adhesiveness and reducing friction at an extremely low temperature, a solid lubricant for preventing galling, and a rust-preventing agent for preventing rust over a long term from application of the solid lubricating coating until use.

[Binder]

The binder of the present embodiment consists of ethylene-vinyl acetate resin (EVA), polyolefin resin (PO), and a wax (W) having a fusing point of 110° C. or less. In order to realize high coating adhesiveness across a range from normal temperature to an extremely low temperature, the mass ratio between the ethylene-vinyl acetate resin, the polyolefin resin and the wax is as follows:

$$1.0 \le (EVA/PO) \le 1.8, \text{ and}$$

$$0.7 \le ((EVA+PO)/W) \le 1.6$$

The above described mass ratio is an item that has been revealed for the first time by experimentation in the present invention. Note that, EVA, PO and W in the above formula represent the masses of the ethylene-vinyl acetate resin, polyolefin resin and wax, respectively.

If the mass ratio of ethylene-vinyl acetate resin with respect to polyolefin resin (EVA/PO) is less than 1.0, the adhesive strength of the solid lubricating coating will be insufficient at a temperature that is more than −20° C. On the other hand, if (EVA/PO) is more than 1.8, the adhesive strength of the solid lubricating coating will be insufficient at an extremely low temperature of −20° C. or less. In order to maintain adhesiveness in a well-balanced manner through an extremely low temperature (−20 to −60° C.), a low temperature (−20 to 0° C.), and warm and tropical temperatures (−10 to 50° C.), the lower limit of (EVA/PO) is 1.0 and the upper limit thereof is 1.8. To secure the effect thereof more reliably, a preferable lower limit of (EVA/PO) is 1.05, more preferably is 1.1, further preferably is 1.15, still further preferably is 1.2, and even more preferably is 1.35. A preferable upper limit of (EVA/PO) is 1.7, more preferably is 1.65, and further preferably is 1.6.

If a ratio ((EVA+PO)/W) of the combined mass of the aforementioned two resins (ethylene-vinyl acetate resin and polyolefin resin) with respect to the mass of the wax is less than 0.7, the hardness of the solid lubricating coating will be low and the adhesive strength thereof will be insufficient. On the other hand, if ((EVA+PO)/W) is more than 1.6, the hardness of the solid lubricating coating will be too high, and the frictional resistance will be high, particularly at an extremely low temperature. In such a case, the torque when tightening or loosening the threaded connection will be too high. Accordingly, from the viewpoint of hardness regulation and friction adjustment that are suitable for a solid lubricating coating for a threaded connection, the lower limit of ((EVA+PO)/W) is 0.7 and the upper limit thereof is 1.6. To secure the effect thereof more reliably, a preferable lower limit of ((EVA+PO)/W) is 0.8, more preferably is 0.85, and further preferably is 0.9. A preferable upper limit of ((EVA+PO)/W) is 1.5, more preferably is 1.45, and further preferably is 1.4.

Polyolefin resin (PO) is a generic name for chain hydrocarbons having a double bond at one position. Since a polyolefin resin (PO) is constituted by a crystal polymer, the physical properties thereof change according to the crystallinity. Polyethylene, polypropylene and the like are available as resins of this kind, and HM712 (softening point 120° C.) manufactured by Cemedine Co. Ltd. or the like may be mentioned as a specific example thereof.

Ethylene-vinyl acetate resin (EVA) is a copolymer of ethylene and vinyl acetate. HM224 (softening point 86° C.) manufactured by Cemedine Co. Ltd. or the like may be mentioned as a specific example thereof.

The wax (W) suppresses galling by reducing friction of the solid lubricating coating. The wax also adjusts the hardness of the solid lubricating coating and increases the toughness of the solid lubricating coating. Any of animal, vegetable, mineral, and synthetic waxes can be used as the wax. The waxes which can be used are, for example, beeswax and whale wax (animal waxes); Japan wax, carnauba wax, candelilla wax, and rice wax (vegetable waxes); paraffin wax, microcrystalline wax, petrolatum, montan wax, ozokerite, and ceresine (mineral waxes); and oxide wax, polyethylene wax, Fischer-Tropsch wax, amide wax, hardened castor oil (castor wax) (synthetic waxes). A wax having a fusing point of 110° C. or less is used. If the fusing point of the wax is 110° C. or less, a difference between the adhesive strength (hardness) of the solid lubricating coating in the vicinity of normal temperature and the adhesive strength of the solid lubricating coating in an extremely low temperature environment is small. By this means, cracking of the solid lubricating coating in an extremely low temperature environment can be suppressed. In addition, peeling of the solid lubricating coating when returned to a temperature in the vicinity of normal temperature can be suppressed. That is, the adhesive strength (hardness) of the solid lubricating coating can be maintained in an appropriate range, and in addition, the toughness of the solid lubricating coating increases. The fusing point of the wax is preferably 100° C. or less, and paraffin wax having a fusing point of 90° C. or less and with a molecular weight of 150 to 500 is more preferable. Furthermore, the wax is preferably a solid at normal temperature. A preferable lower limit of the fusing point of the wax is 40° C. By using wax that is a solid at normal temperature, the adhesive strength of the solid lubricating coating can be kept in an appropriate range in the vicinity of normal temperature.

The content of the binder with respect to the composition is preferably 60 to 80% by mass (hereunder, unless specifically stated otherwise, content is described as mass percent). If the binder content is 60% or more, the adhesiveness of the solid lubricating coating is further enhanced. If the binder content is 80% or less, the lubricity is more favorably maintained.

Preferably, an ethylene-vinyl acetate resin or a polyolefin resin having a melting temperature (or a softening temperature; the same applies hereinafter) of 80 to 320° C. is used as the binder. The melted base (binder) returns to a solid when the temperature becomes lower than the melting temperature. The melting temperature is more preferably within a range of 90 to 200° C. If the melting temperature of the ethylene-vinyl acetate resin or polyolefin resin that serves as the coating base is too high, application thereof in a molten state such as by hot melt coating is difficult. On the other hand, if the melting temperature of the binder is too low, particularly a case can arise in which the solid lubricating coating softens when it is exposed to a high temperature, and the performance thereof declines.

As described later, a contact surface of the threaded connection on which the lubricating coating is formed may be subjected to a preconditioning treatment by chemical treatment or plating or the like. In consideration of the adhesiveness, film-forming properties and coating properties of the solid lubricating coating with respect to a contact surface of a steel pipe, the viscosity at the time of melting of the solid lubricating coating, and the dispersibility of the solid lubricant and the like, it is preferable that the ethylene-vinyl acetate resin and the polyolefin resin are mixtures that combine a plurality of kinds of resins having different properties such as their fusing point, softening point and glass transition point.

In order to suppress the occurrence of rapid softening due to a temperature increase, it is particularly preferable that the ethylene-vinyl acetate resin that is used as the base (binder) is a mixture of two or more kinds of ethylene-vinyl acetate resins that have different melting temperatures. Likewise, it is particularly preferable that the polyolefin resin that is used as the base (binder) is a mixture of two or more kinds of polyolefin resin that have different melting temperatures.

[Fluorine Addition Agent]

The solid lubricating coating of the present embodiment contains the binder as a base, and also contains a fluorine addition agent. The fluorine addition agent improves a sliding property at the time of sliding. The fluorine addition agent also increases the toughness of the solid lubricating coating at an extremely low temperature. The fluorine addition agent is, for example, liquid-based perfluoropolyether (PFPE) or a fluorinated polymer in grease form or the like. PFPE and a fluorinated polymer are preferably used as the fluorine addition agent because of the easiness of adding the PFPE or fluorinated polymer to the binder. A perfluoropolyether-modified product such as fluorinated polyether having a basic skeleton with a molecular weight of 500 to 10000 can also be used as the fluorine addition agent.

A favorable content of the fluorine addition agent with respect to the composition is 8 to 18%. If the content of the fluorine addition agent is 8% or more, the lubricity and adhesiveness at a low temperature are further increased. If the content of the fluorine addition agent is 18% or less, the adhesiveness at normal temperature can be more favorably maintained.

[Solid Lubricant]

In order to further improve the lubricity thereof, the solid lubricating coating contains various kinds of solid lubricants. Here, the term solid lubricant refers to a powder that has lubricity. Solid lubricants are broadly classified into the following four kinds:

(1) solid lubricants which exhibit lubricity due to having a specific crystal structure which easily slides, such as a hexagonal layered crystal structure (for example, graphite, zinc oxide, and boron nitride);

(2) solid lubricants which exhibit lubricity due to having a reactive element in addition to a crystal structure (for example, molybdenum disulfide, tungsten disulfide, graphite fluoride, tin sulfide, and bismuth sulfide);

(3) solid lubricants which exhibit lubricity due to having chemical reactivity (for example, certain thiosulfate compounds), and (4) solid lubricants which exhibit lubricity due to plastic or viscoplastic behavior under a frictional stress (for example, polytetrafluoroethylene (PTFE) and polyamides).

Any' of the solid lubricants described in the above (1) to (4) can be used in the present invention. Preferable solid lubricants are the solid lubricants described in (1). The solid lubricants described in (1) may be used independently, and may also be used in combination with the solid lubricants described in at least one of the above (2) and (4). Graphite is a preferable solid lubricant from the viewpoint of adhesiveness and rust preventing properties, and amorphous graphite is more preferable from the viewpoint of film-forming properties. The content of the solid lubricant in the solid lubricating coating (and the composition for a solid lubricating coating) is preferably in the range of 5-15% by mass.

The composition for a solid lubricating coating may further contain an inorganic powder for adjusting sliding properties. Examples of such an inorganic powder are titanium dioxide and bismuth oxide. The inorganic powder can be present in the composition in a total amount of up to 10% by mass.

The solid lubricating coating according to the invention of the present application actively contains a rust proof addition agent for ensuring rust preventing properties over a long term from application until actual use. Examples of the rust proof addition agent include aluminum tripolyphosphate, aluminum phosphite, and calcium ion-exchanged silica. Commercially available reactive water repellents or the like can also be used.

A preferable content of the rust proof addition agent in the composition is 2 to 10% by mass. If the content of the rust proof addition agent is 2% by mass or more, the rust preventing properties of the solid lubricating coating are further improved. If the content of the rust proof addition agent is 10% by mass or less, the lubricity and adhesiveness of the solid lubricating coating can be more favorably maintained.

[Friction Modifier]

The above described composition for a solid lubricating coating may further contain talc as a friction modifier. Talc is a white or gray-colored inorganic powder that is obtained by crushing an ore called talc. The chemical name for talc is hydrated magnesium silicate, and the chemical composition thereof is $Mg_3Si_4O_{10}(OH)_2$. Talc contains approximately 60% by mass of $SiO_2$, approximately 30% by mass of $MgO$, and approximately 4.8% by mass of crystal water. The true specific gravity of talc is 2.7 to 2.8, and the Mobs hardness thereof is 1, which is the lowest among inorganic minerals. Talc also has excellent heat resistance, and is a chemically stable substance. Therefore, talc can be used as a filler. The dispersibility of talc can be modified by chemically or physically bonding a treatment material to the talc surface, and surface-modified talc is also included in the talc of the present embodiment.

Talc works to enlarge the difference between yield torque (when it is high interfacial pressure) and shouldering torque (when it is low interfacial pressure) when fastening a threaded connection. If there is a large difference between the yield torque and the shouldering torque, the range of the fastening torque when fastening the threaded connection can be wide. Consequently, it is easy to adjust the torque when fastening the threaded connection. This effect is obtained because, in a case where the interfacial pressure of a contact sliding surface of the threaded connection is high, the talc maintains the coefficient of friction in appropriate level. If the content of talc in the composition is 2% by mass or more, this effect can be increased, and if the content is 15% by mass or less, there is little risk of losing galling resistance. Therefore, the content of talc is preferably 2 to 15% by mass. From the viewpoint of galling resistance and adhesiveness of the solid coating, a more preferable lower limit of the talc content is 3% by mass, and further preferably is 5% by mass. A more preferable upper limit of the talc content is 10% by mass, and further preferably is 8% by mass.

Preferably, the particle size of the talc of the present embodiment is 1 to 12 μm. If the particle size of the talc is 1 μm or more, the effect of enlarging the difference between yield torque and shouldering torque can be stably obtained. If the particle size of the talc is 12 μm or less, there is little risk of a decline in the dispersibility in the solid lubricating coating or the adhesiveness. A more preferable lower limit of the talc particle size is 3 μm, and further preferably is 4 μm. A more preferable upper limit of the talc particle size is 10 μm, and further preferably is 8 μm. In the present specification, the term "particle size" refers to a median diameter (D50) that is determined based on the particle size distribution.

With regard to the particle size of the talc, for example, a particle size distribution is created by accumulation using a laser diffraction particle size analyzer. The median diameter can then be obtained by calculation based on the particle size distribution that is obtained.

Preferably, the specific surface area of the talc according to the present embodiment is 4 to 12 $m^2/g$. If the specific surface area of the talc is 4 $m^2/g$ or more, the affinity between the talc and the binder in the solid lubricating coating increases. Consequently, dropping off of the talc from the solid lubricating coating surface at a time of sliding can be suppressed. If the specific surface area of the talc is 12 $m^2/g$ or less, the effect of enlarging the difference between yield torque and shouldering torque can be stably obtained. A more preferable lower limit of the specific surface area of the talc is 6 $m^2/g$, and further preferably is 7 $m^2/g$. A more preferable upper limit of the specific surface area of the talc is 11 $m^2/g$, and further preferably is 10 $m^2/g$.

The specific surface area of the talc can be determined, for example, by the BET method. More specifically, using a specific surface area automatic measuring apparatus, a gas with respect to which an adsorption occupying area is already known (for example, nitrogen gas) is caused to adsorb on the surface of the talc. The amount of adsorbed single molecules is then calculated using a BET equation based on the relation between the pressure of the gas and the adsorbed amount of gas. Further, the specific surface area can be calculated by multiplying by the adsorption occupying area per unit gas molecule.

[Other Components]

In addition to the above described components, the composition of the present embodiment may also contain small amounts of other additives selected from surfactants, colorants, antioxidant agents and the like in a total amount of, for example, 5% by mass or less. The composition for a solid lubricating coating can further contain an extreme pressure agent, a liquid lubricant or the like as long as the amount thereof is an extremely small amount of 2% by mass or less.

According to the present embodiment, a composition for forming a solid lubricating coating (hereunder, also referred to as "coating composition") for forming the above described solid lubricating coating is provided. The coating composition may be a solventless composition consisting only of the above described components, or may be a solvent-based composition that is dissolved in a solvent. In the case where the coating composition is a solvent-based composition, the mass percent of the respective components refers to the mass percent when the total mass of all components other than the solvent included in the composition is taken as 100%. Hereunder, an example of a method of producing a threaded connection for pipe or tube using the coating composition will be described.

A solventless coating composition can be prepared by, for example, blending a solid lubricant and a rust proof addition agent or the like with a base in a molten state, followed by kneading. A powder mixture in which all the components in a powder state are mixed can be used as a coating composition. A solventless composition has the advantages that it can form a lubricating coating in a short period of time and that there is no evaporation of organic solvents which affect the environment.

Such a solventless coating composition can form a solid lubricating coating by using the hot melt method, for example. According to this method, a coating composition (containing the above-described base and various powders) which has been heated to cause the base to melt and form a composition in a fluid state that has a low viscosity is sprayed from a spray gun having a function that maintains the temperature at a fixed temperature (normally around the same temperature as the temperature of the composition in a molten state). The temperature to which the composition is heated is preferably made 10 to 50° C. higher than the fusing point (the melting temperature or the softening temperature) of the base (the mixture in the case of a mixture).

The contact surface of at least one of a pin and a box on which the composition is to be coated is preferably preheated to a temperature higher than the fusing point of the base. It is thereby possible to obtain favorable coatability.

The coating composition is heated and melted inside a tank equipped with a suitable stirring apparatus, and is supplied to the spray head (which is maintained at a prescribed temperature) of a spray gun through a metering pump by a compressor and sprayed at the relevant contact surface. The temperature at which the inside of the tank and the spray head are maintained is adjusted in accordance with the fusing point of the base in the composition.

Thereafter, the threaded connection is cooled by air cooling or by being allowed to cool or the like to thereby solidify the composition for forming a solid lubricating coating and form the solid lubricating coating according to the present embodiment on the contact surface. The thickness of a solid lubricating coating formed in this manner is preferably in the range of 10 to 200 μm, and more preferably in the range of 25 to 100 μm. If the thickness of the solid lubricating coating is too thin, the lubricity of the threaded connection will be insufficient and galling will easily occur at the time of tightening or loosening. Although the solid lubricating coating has an anticorrosive property to some extent, if the coating thickness is too thin, the anticorrosive property will also be inadequate and the corrosion resistance of the contact surface will decrease.

On the other hand, if the thickness of the solid lubricating coating is too thick, not only will the solid lubricating coating be wasted, but the environment may also be affected thereby. When the solid lubricating coating and a solid anticorrosive coating, described later, which is formed as required are formed on a contact surface with respect to which the surface roughness was increased by preconditioning treatment, preferably they both have a coating thickness that is greater than a surface roughness Rmax of the substrate. The reason is that, if this is not the case, it is sometimes not possible to completely cover the substrate. The coating thickness when the substrate has a rough surface is the average value of the coating thickness of the entire coating, which can be calculated based on the area, the mass, and the density of the coating.

Note that, in a case where the solid lubricating coating is formed as a thin film with a thickness of 25 μm or less, a thin film of a rust preventive coating in a solid or liquid form may further be formed on an upper layer or a lower layer of the solid lubricating coating.

[Solid Anticorrosive Coating]

When the above-described thermoplastic solid lubricating coating is formed on the contact surface of only one of the pin and the box (for example, the box) of a threaded connection, for example, only the contact surface of the other (for example, the pill) may be subjected to the preconditioning treatment that is described later. However, in order to impart rust preventing properties, preferably a solid anticorrosive coating is formed as a topmost surface treatment coating layer on the contact surface of the other.

As described above with regard to FIG. 1, up to the time when a threaded connection is actually used, a protector is often mounted on the pin and box with respect to which tightening has not been performed. The solid anticorrosive coating is required to be formed so that the coating is not broken by at least a force that is applied when mounting a protector thereon, the coating does not dissolve when exposed to water formed by condensation due to the dew point during shipment or storage, and the coating does not easily soften even at a high temperature of more than 40° C.

A solid anticorrosive coating formed from a composition that contains as a main ingredient an ultraviolet curing resin, which is known to be capable of forming a high strength coating, is a coating that satisfies the requirements with respect to the foregoing properties. Known resin compositions constituted by at least a monomer, an oligomer, and a photopolymerization initiator can be used as the ultraviolet curing resin. The components or composition of the ultraviolet curing resin composition is not particularly limited as long as a photopolymerization reaction is produced by irradiation with ultraviolet rays to form a cured coating.

Examples of the monomer that may be mentioned include polyvalent (di, tri, or higher) esters of polyhydric alcohols with (meth)acrylic acid, various (meth)acrylate compounds, N-vinylpyrrolidone, N-vinylcaprolactam, and styrenes. Examples of the oligomer that may be mentioned include, but are not limited to, epoxy (meth)acrylates, urethane (meth)acrylates, polyester (meth)acrylates, polyether (meth)acrylates, and silicone (meth)acrylates.

Preferable photopolymerization initiators are compounds having absorption in a wavelength region of 260 to 450 nm. Examples of the photopolymerization initiator include benzoin and its derivatives, benzophenone and its derivatives, acetophenone and its derivatives, Michler's ketone, benzil and its derivatives, tetraalkylthiuram monosulfides, and thioxanes. Thioxanes are particularly preferable as the photopolymerization initiator.

From the viewpoint of coating strength and sliding properties, a solid anticorrosive coating formed from an ultraviolet curing resin may contain addition agents selected from lubricants and rust-preventing agents. Example of an addition agent is a fibrous filler. The fibrous filler is, for example, acicular calcium carbonate such as "Whiskal" that is manufactured by Maruo Calcium Co., Ltd. Examples of a lubricant are metal soaps such as calcium stearate and zinc stearate, and polytetrafluoroethylene (PTFE) resin and a fibrous filler. One or more kinds of these lubricants can be added in an amount of 0.05 to 0.35 parts by mass with respect to one part by mass of the ultraviolet curing resin. If the amount is 0.05 parts or less, the strength of the coating is sometimes inadequate. On the other hand, if the amount is more than 0.35 parts, the viscosity of the coating composition is high and the ease of coating decreases and, conversely, this sometimes leads to a decrease in the coating strength.

The rust-preventing agent is, for example, aluminum tripolyphosphate or aluminum phosphite or the like. The rust-preventing agent can be added in an amount of up to 0.10 parts by mass with respect to one part by mass of the ultraviolet curing resin.

A solid anticorrosive coating formed from an ultraviolet curing resin is often transparent. From the viewpoint of facilitating quality inspection (such as inspection for the presence or absence of a coating or for uniformity/unevenness of the coating thickness) by visual examination or by image processing of the solid anticorrosive coating which is formed, the solid anticorrosive coating may contain a colorant. Colorants which are used can be selected from pigments, dyes, and fluorescent materials. Fluorescent materials sometimes do not give coloration to a coating under visible light, but they give coloration to the coating at least under ultraviolet rays. Therefore, they are included as colorants in the present invention. Commercially available items may be used for these colorants, and the colorants are not particularly limited as long as quality inspection of a solid anticorrosive coating is possible visually or by image processing. Either organic or inorganic colorants can be used.

The transparency of the solid anticorrosive coating decreases or is lost when a pigment is added. If the solid anticorrosive coating becomes non-transparent, it becomes difficult to inspect for damage of an underlying pin thread part. Accordingly, when a pigment is used, a pigment having a high degree of brightness such as a yellow or white pigment is preferable. From the viewpoint of corrosion prevention, the particle diameter of a pigment is preferably as small as possible, and it is preferable to use a pigment with an average particle diameter of not more than 5 µm. Dyes do not greatly decrease the transparency of the solid anticorrosive coating, and hence a problem does not arise even if, for example, a dye having a strong color such as red or blue is used. The added amount of the pigment or dye is preferably a maximum of 0.05 parts by mass with respect to one part by mass of the ultraviolet curing resin. If the amount is more than 0.05 parts by mass, an anticorrosive property may decrease. A more preferable added amount is not more than 0.02 parts by mass.

A fluorescent material can be any of a fluorescent pigment, a fluorescent dye, and a phosphor used in a fluorescent paint. Fluorescent pigments are broadly categorized as inorganic fluorescent pigments and daylight fluorescent pigments. Examples of inorganic fluorescent pigments include pigments based on zinc sulfide or zinc cadmium sulfide (containing a metal activator), halogenated calcium phosphates, rare earth-activated strontium chloroapatite, and the like. Two or more kinds of these inorganic fluorescent pigments are often used in combination. Inorganic fluorescent pigments have excellent resistance to weather and heat.

There are also several kinds of daylight fluorescent pigments, and the main kinds are synthetic resin solid solution type pigments in which a fluorescent dye is incorporated into a colorless synthetic resin to form a pigment. A fluorescent dye itself can also be used. Various kinds of inorganic or organic fluorescent pigments and particularly synthetic resin solid solution type pigments are also used in fluorescent paints and fluorescent printing inks, and those phosphors can be used as fluorescent pigments or fluorescent dyes.

Although a solid anticorrosive coating containing a fluorescent pigment or dye is colorless or has a transparent color under visible light, when the solid anticorrosive coating is irradiated with black light or ultraviolet rays, the solid anticorrosive coating fluoresces and becomes colored, and it becomes possible to ascertain whether or not a coating is present and to check for unevenness in the coating thickness or the like. Since the coating is transparent under visible light, the base metal underneath the solid anticorrosive coating can be observed. Accordingly, inspection for damage of thread parts of a threaded connection is not obstructed by the solid anticorrosive coating. The added amount of these fluorescent materials is preferably up to a maximum of approximately 0.05 parts by mass with respect to one part by mass of the ultraviolet curing resin. If the added amount is more than 0.05 parts by mass, an anticorrosive property may decrease. A more preferable added amount is not more than 0.02 parts by mass. Further, to enable quality control not only of the solid anticorrosive coating but also of the underlying thread parts, it is preferable to use a fluorescent material and particularly a fluorescent pigment as a colorant.

After a composition having an ultraviolet curing resin as a main ingredient (including a composition consisting only of an ultraviolet curing resin composition) is applied to the contact surface of a threaded connection, the coating is cured by irradiation with ultraviolet rays to form a solid anticorrosive coating made from an ultraviolet cured resin layer.

A solid anticorrosive coating having two or more ultraviolet cured resin layers may also be formed by repeating the process of applying and then irradiating with ultraviolet rays. By forming multiple layers of a solid anticorrosive coating in this manner, the coating strength is further increased, the solid anticorrosive coating is not broken even when a force is applied when tightening a threaded connection, and the corrosion resistance of the threaded connection is further improved. In the present invention, because a lubricating coating is not present beneath the solid anticorrosive coating, it is not necessary for the solid anticorrosive coating to be broken during tightening of a threaded connection, and not breaking the solid anticorrosive coating in this manner increases the corrosion resistance of the threaded connection.

Irradiation with ultraviolet rays can be carried out using a commercially available ultraviolet ray irradiation apparatus having an output wavelength in the region of 200 to 450 nm. Examples of an irradiation source of ultraviolet rays include high pressure mercury vapor lamps, ultrahigh pressure mercury vapor lamps, xenon lamps, carbon arc lamps, metal halide lamps, and sunlight. The length of time for which irradiation is performed and the strength of the irradiated ultraviolet rays can be suitably set by a person skilled in the art.

The thickness of the solid anticorrosive coating (the total coating thickness when the coating consists of two or more ultraviolet cured resin layers) is preferably in the range of 5 to 50 µm, and more preferably in the range of 10 to 40 µm. Preferably, the thickness of the solid anticorrosive coating is less than the thickness of the solid lubricating coating formed on the mating member. If the thickness of the solid anticorrosive coating is too thin, the coating will not adequately function as an anticorrosive coating, and the corrosion resistance of the threaded connection may be inadequate. On the other hand, if the thickness of the solid anticorrosive coating is more than 50 µm, when a protective member such as a protector having a high level of airtightness is mounted on the end of an oil well pipe, the solid anticorrosive coating may be broken by the force at the time of mounting the protector, and the corrosion resistance of the threaded connection will become inadequate. Furthermore, powder produced by wear at such time is discharged into the environment and affects the working environment. Further, if the thickness of the solid anticorrosive coating is thicker than the thickness of the solid lubricating coating on the mating member, the lubricity performance of the lubricating coating may be inhibited.

Since a solid anticorrosive coating having an ultraviolet curing resin as a main ingredient is a transparent coating, the state of a base metal can be observed without removing the coating, and inspection of thread parts can be carried out from above the coating prior to tightening. Accordingly, by forming this solid anticorrosive coating on the contact surface of a pin on which a thread part is formed at the outer surface thereof and which is therefore more susceptible to damage, while leaving the coating in place it is possible to easily inspect for damage to the thread part of a pin that is typically formed on the outer surface of an end of a steel pipe and that is susceptible to damage.

[Preconditioning Treatment]

The thread parts and seal parts which constitute contact surfaces of a threaded connection are formed by cutting operations including thread cutting, and the surface roughness of the contact surfaces is generally around 3 to 5 μm. If the surface roughness of the contact surfaces is made greater than this amount, the adhesiveness of a coating formed on the contact surfaces can be increased, and as a result, performance such as galling resistance and corrosion resistance can be improved. Therefore, prior to forming a coating, preconditioning treatment which can increase the surface roughness is preferably carried out on the contact surface of at least one of, and preferably both of, the pin and the box.

Examples of such preconditioning treatment include a blasting treatment that blasts a blast material such as spherical shot material or angular grit material, and pickling by immersion in a strongly acidic solution such as sulfuric acid, hydrochloric acid, nitric acid, or hydrofluoric acid to roughen the surface texture. These treatments can increase the surface roughness of the base metal itself.

Examples of other types of preconditioning treatment are chemical treatments such as phosphate chemical treatment, oxalate chemical treatment, or borate chemical treatment, and metal plating. These are methods that form an undercoating having a large surface roughness and high adhesiveness on the base metal surface. A chemical coating made of acicular crystals that has a large surface roughness is formed by the chemical treatments. Examples of the metal plating include electroplating with copper, iron, or alloys thereof (because protrusions are preferentially plated, the surface is slightly roughened); impact plating with zinc or a zinc alloy in which particles having an iron core coated with zinc or a zinc-iron alloy or the like are blasted using centrifugal force or air pressure, thereby forming a porous metal coating by deposition of zinc or zinc-iron alloy particles; and composite metal plating in which a coating having minute solid particles dispersed in metal is formed.

Whichever method is used for preconditioning treatment of the contact surface, a surface roughness Rmax resulting from surface roughening by the preconditioning treatment is preferably 5 to 40 μm. If Rmax is less than 5 μm, the adhesiveness with a coating that is formed on the roughened surface may be inadequate. On the other hand, if Rmax is more than 40 μm, friction will increase and the coating may not be able resist shear forces and compressive forces when the coating is subjected to a high interfacial pressure, and the coating may easily break or peel off. Two or more kinds of preconditioning treatment for surface roughening may be used in combination. In addition, different kinds of preconditioning treatment may be performed with respect to the pin and the box.

From the viewpoint of the adhesiveness of the solid anticorrosive coating or the solid lubricating coating, a preconditioning treatment which can form a porous coating is preferable. In particular, phosphate treatment using manganese phosphate, zinc phosphate, iron manganese phosphate, or zinc calcium phosphate, or impact plating to form a zinc or zinc-iron alloy coating is preferable as a preconditioning treatment. From the viewpoint of the adhesiveness with a coating to be formed thereon, a manganese phosphate coating is preferable, and from the viewpoint of corrosion resistance, a zinc or zinc-iron alloy coating with which a sacrificial corrosion effect produced by zinc can be expected is preferable.

Manganese phosphate chemical treatment is particularly preferable as a preconditioning treatment for the solid lubricating coating. Zinc phosphate chemical treatment and zinc or zinc-iron alloy plating by impact plating are particularly preferable as preconditioning treatments for the solid anticorrosive coating.

A coating formed by phosphate treatment and a zinc or zinc-iron alloy coating formed by impact plating are both porous coatings. By forming a solid anticorrosive coating or a solid lubricating coating on such a porous coating, the adhesiveness of the upper coating is increased by a so-called "anchor effect" of the porous coating. As a result, it becomes more difficult for peeling of the solid lubricating coating to occur even when tightening and loosening are repeated, and direct metal-to-metal contact is effectively prevented, leading to a further improvement in galling resistance, airtightness, and corrosion resistance.

Phosphate treatment can be carried out by immersion or spraying in a conventional manner. An acidic phosphating solution which is commonly used for zinc-plated steel materials can be used as the chemical treatment solution. For example, a zinc phosphating solution containing 1 to 150 g/L of phosphate ions, 3 to 70 g/L of zinc ions, 1 to 100 g/L of nitrate ions, and 0 to 30 g/L of nickel ions can be used. A manganese phosphating solution that is normally used for threaded connections can also be used. The temperature of the solution can be from normal temperature to 100° C., and the duration of treatment can be up to 15 minutes in accordance with the desired coating thickness. In order to accelerate coating formation, an aqueous surface conditioning solution containing colloidal titanium may be supplied to the surface to be treated prior to phosphate treatment. After phosphate treatment, washing is preferably carried out with cold or warm water followed by drying.

Impact plating can be carried out by mechanical plating in which particles are impacted against a material to be plated inside a rotating barrel, or by blast plating in which particles are impacted against the material to be plated using a blasting apparatus. In the present invention, it is sufficient to plate only the contact surface of a threaded connection, and hence it is preferable to employ blast plating which can perform localized plating. For example, a blast material in the form of particles having an iron core whose surface is coated with zinc or a zinc alloy (for example, a zinc-iron alloy) is blasted against a contact surface to be coated. The content of zinc or a zinc alloy in the particles is preferably in the range of 20 to 60% by mass, and the particle diameter is preferably in the range of 0.2 to 1.5 mm. Blasting of the particles causes only the zinc or zinc alloy which is the coating layer of the particles to adhere to the contact surface, and a porous coating made of zinc or a zinc alloy is thereby formed on the contact surface. This blast plating can form a plated coating having good adhesiveness with respect to a steel surface regardless of the material quality of the steel.

From the viewpoint of both corrosion resistance and adhesiveness, the thickness of a zinc or zinc alloy layer formed by impact plating is preferably 5 to 40 μm. If the thickness of the zinc or zinc alloy layer is less than 5 μm, it may not be possible to secure sufficient corrosion resistance. On the other hand, if the thickness is more than 40 μm, the adhesiveness with respect to a lubricating coating may in fact decrease. Similarly, the thickness of a phosphate coating is preferably in the range of 5 to 40 μm.

As another available preconditioning treatment, a specific kind of single-layer or multiple-layer electrolytic plating is effective for increasing galling resistance when used to form a substrate for a solid lubricating coating in particular, although this kind of preconditioning treatment does not provide a surface roughening effect. Examples of such kind of plating include single-layer plating with Cu, Sn, or Ni metal, single-layer plating with a Cu—Sn alloy as disclosed in Japanese Patent Application Publication No. 2003-074763, two-layer plating with a Cu layer and an Sn layer, and three-layer plating with an Ni layer, a Cu layer, and an Sn layer. Cu—Sn alloy plating, two-layer plating by Cu plating and Sn plating, and three-layer plating by Ni plating, Cu plating, and Sn plating are preferable for a steel pipe made from a steel having a Cr content of 5% or more. More preferable are two-layer plating by Cu plating and Sn plating, three-layer plating by Ni strike plating, Cu plating, and Sn plating, and Cu—Sn—Zn alloy plating. Such metal or metal alloy plating can be carried out in accordance with a method described in Japanese Patent Application Publication No. 2003-074763. In the case of multiple layer plating, the lowermost plating coating (usually Ni plating) is preferably an extremely thin plating layer having a thickness of less than 1 μm formed by so-called strike plating. The thickness of the plating (the overall thickness in the case of multiple layer plating) is preferably in the range of 5 to 15 μm.

EXAMPLES

Examples of the present invention are described hereunder. However, the present invention is not limited by the examples. In the examples, the contact surface of a pin will be referred to as the pin surface and the contact surface of a box will be referred to as the box surface. Unless otherwise specified, percent and part in the examples mean mass percent and part by mass, respectively.

Inventive Example 1 of the Present Invention

The pin surface and box surface of a threaded connection VAM 21® manufactured by Nippon Steel & Sumitomo Metal Corporation (outer diameter of 24.448 cm (9 and ⅝ inches), wall thickness of 1.199 cm (0.472 inches)) made of carbon steel (C, 0.21%, Si: 0.25%, Mn: 1.1%, P: 0.02%, S: 0.01%, Cu: 0.04%, Ni: 0.06%, Cr: 0.17%, Mo: 0.04%, balance: iron and impurities) were subjected to the following preconditioning treatment.

The pin surface was finished by machine grinding (surface roughness of 3 μm) and thereafter immersed for 10 minutes in a zinc phosphating solution at 75 to 85° C. to form a zinc phosphate coating with a thickness of 10 μm (surface roughness of 8 μm). The box surface was finished by machine grinding (surface roughness of 3 μm) and thereafter immersed for 10 minutes in a manganese phosphating solution at 80 to 95° C. to form a manganese phosphate coating with a thickness of 12 μm (surface roughness of 10 μm).

A composition for forming a solid lubricating coating having the below-described composition was heated to 120° C. in a tank equipped with a stirring mechanism to make the composition into a molten state having a viscosity suitable for coating, and the pin surface and the box surface which had undergone the above-described preconditioning treatment were preheated to 130° C. by induction heating. Thereafter, the composition for forming a solid lubricating coating that is shown in regard to Inventive Example 1 of the present invention in Table 1 in which the base resin was in a molten state was applied onto both the pin surface and the box surface using a spray gun having a spray head with a temperature maintaining function. After cooling, a solid lubricating coating having an average thickness of 30 μm was formed. Note that, with respect to each of Inventive Example 1 of the present invention and Inventive Examples 2 to 8 of the present invention and Comparative Examples 1 to 6 that are described later, Table 1 shows the chemical composition (in percent by mass) of a composition for forming a lubricating coating, the mass ratio of ethylene-vinyl acetate resin with respect to polyolefin resin (EVA/PO), a ratio of the sum of the masses of the aforementioned two resins with respect to the wax ((EVA+PO)/W), and the sum (in percent by mass) of the mass ratios of the binder with respect to the total composition.

TABLE 1

Chemical Composition of Composition for Forming Solid Lubricating Coating (in percent by mass)

| No. | Binder | | | Fluorine Addition Agent | Solid Lubricant Powder | Rust Proof Addition Agent |
|---|---|---|---|---|---|---|
| | Ethylene-vinyl Acetate Resin (EVA) | Polyolefin Resin (PO) | Wax (W) | | | |
| Inventive Example 1 of Present Invention | 21.6 | 16 | Paraffin wax Fusing point 69° C. (32.4) | PFPE (10) Fluorinated polymer (4) | Graphite (5) Graphite fluoride (4) | Calcium ion-exchanged silica (5) Aluminum phosphite (2) |
| Inventive Example 2 of Present Invention | 17 | 12.2 | Paraffin wax Fusing point 69° C. (36.8) | PFPE (10) Fluorinated polymer (7) | Graphite (10) | Calcium ion-exchanged silica (5) Aluminum phosphite (2) |
| Inventive Example 3 of Present Invention | 22 | 21 | Paraffin wax Fusing point 69° C. (31) | PFPE (10) Fluorinated polymer (4) | PTFE (10) | Aluminum phosphite (2) |

TABLE 1-continued

| | | | | | | |
|---|---|---|---|---|---|---|
| Inventive Example 4 of Present Invention | 26 | 16 | Paraffin wax Fusing point 69° C. (37) | PFPE (9) | Graphite (5) Graphite fluoride (4) | Aluminum phosphite (3) |
| Inventive Example 5 of Present invention | 21.6 | 16 | Polyethylene wax Fusing point 110° C. (32.4) | PFPE (10) Fluorinated polymer (4) | Graphite (5) Graphite fluoride (4) | Calcium ion-exchanged silica (5) Aluminum phosphite (2) |
| Inventive Example 6 of Present Invention | 20.5 | 19.5 | Polyethylene wax Fusing point 78° C. (36) | PFPE (8) | Graphite (7) | Calcium ion-exchanged silica (3) Aluminum phosphite (4) |
| Inventive Example 7 of Present Invention | 20.5 | 19.5 | Polyethylene wax Fusing point 78° C. (33) | PFPE (8) | Graphite (7) | Calcium ion-exchanged silica (3) Aluminum phosphite (4) |
| Inventive Example 8 of Present Invention | 20.5 | 19.5 | Polyethylene wax Fusing point 78° C. (32) | PFPE (8) | Graphite (7) | Calcium ion-exchanged silica (3) Aluminum phosphite (4) |
| Comparative Example 1 | 0 | 19 | Carnauba wax (15) | Polytetrafluoro-ethylene (2) | Graphite fluoride (7) BN (1) | Calcium sulfonate derivative (30) |
| Comparative Example 2 | 0 | 9 | Carnauba wax (15) | 0 | Graphite fluoride (3.5) Bismuth trioxide (5) | Corrosion inhibitor (40) |
| Comparative Example 3 | 13.5 | 15 | Paraffin wax Fusing point 69° C. (26.5) | PFPE (10) Fluorinated polymer (4) | Graphite (5) Graphite fluoride (4) | Calcium sulfonate derivative (15) Calcium ion-exchanged silica (5) Aluminum phosphite (2) |
| Comparative Example 4 | 25.5 | 14 | Paraffin wax Fusing point 69° C. (31.5) | PFPE (10) Fluorinated polymer (4) | Graphite (5) Graphite fluoride (4) | Calcium ion-exchanged silica (5) Aluminum phosphite (2) |
| Comparative Example 5 | 13.5 | 10 | Paraffin wax Fusing point 69° C. (46.5) | PFPE (10) Fluorinated polymer (4) | Graphite (5) Graphite fluoride (4) | Calcium ion-exchanged silica (5) Aluminum phosphite (2) |
| Comparative Example 6 | 27 | 20 | Paraffin wax Fusing point 69° C. (23) | PFPE (10) Fluorinated polymer (4) | Graphite (5) Graphite fluoride (4) | Calcium ion-exchanged silica (5) Aluminum phosphite (2) |

TABLE 1-continued

| No. | Friction Modifier | Other | EVA/PO | (EVA + PO)/W | Sum of Mass Ratios of Binder |
|---|---|---|---|---|---|
| Inventive Example 1 of Present Invention | 0 | None | 1.35 | 1.16 | 70 |
| Inventive Example 2 of Present Invention | 0 | None | 1.39 | 0.79 | 66 |
| Inventive Example 3 of Present Invention | 0 | None | 1.05 | 1.39 | 74 |
| Inventive Example 4 of Present Invention | 0 | None | 1.63 | 1.14 | 79 |
| Inventive Example 5 of Present invention | 0 | None | 1.35 | 1.16 | 70 |
| Inventive Example 6 of Present Invention | Talc Particle size 4.5 μm Specific surface area 9.5 m$^2$/g (2) | None | 1.05 | 1.11 | 76 |
| Inventive Example 7 of Present Invention | Talc Particle size 3.3 μm Specific surface area 12.0 m$^2$/g (5) | None | 1.05 | 1.21 | 73 |
| Inventive Example 8 of Present Invention | Talc Particle size 8.0 μm Specific surface area 7.0 m$^2$/g (6) | None | 1.05 | 1.25 | 72 |
| Comparative Example 1 | 0 | Other (balance) | 0 | 1.27 | 34 |
| Comparative Example 2 | 0 | Other (balance) | 0 | 0.60 | 24 |
| Comparative Example 3 | 0 | None | 0.9 | 1.08 | 55 |
| Comparative Example 4 | 0 | None | 1.82 | 1.25 | 71 |
| Comparative Example 5 | 0 | None | 1.35 | 0.51 | 70 |
| Comparative Example 6 | 0 | None | 1.35 | 2.04 | 70 |

The composition of the composition for forming a lubricating coating in Inventive Example 1 of the present invention was as follows. Note that, as described above, unless specifically stated otherwise, content (%) indicates mass percent.
(Binder)
  ethylene-vinyl acetate resin: 21.6%
  polyolefin resin: 16%
  wax (paraffin wax, fusing point 69° C.): 32.4%
(Fluorine Addition Agent)
  PFPE (perfluoropolyether): 10%
  fluorinated polymer: 4%
(Solid Lubricant)
  amorphous graphite (average particle diameter 7 μm): 5%
  graphite fluoride (CFx): 4%

(Rust Proof Addition Agent)
  Ca ion-exchanged silica: 5%
  aluminum phosphite: 2%

For Inventive Example 1 of the present invention, a repeated tightening and loosening test (tightening speed of 10 rpm, tightening torque of 42.8 kN-m) was performed 10 times on the threaded connection at a low temperature of approximately −40° C. More specifically, the tightening and loosening test was performed after cooling the periphery of a thread fastening part with dry ice to approximately −40° C. The results showed that even when cooled to −40° C., peeling or cracking of the solid lubricating coating did not occur. The state of galling of the contact surfaces of the pin and the box after repeated fastening (the number of times that fastening could be performed without the occurrence of galling (up to a maximum of 10 times); note that when light galling which could be repaired occurred, repair was performed and tightening was continued) was investigated. The results are shown as the galling occurrence state in Table 2. It was found that, as the result of performing the tightening and loosening test the second and subsequent time after cooling to −40° C. in the same manner as the first time, there was no occurrence of galling, and tightening and loosening could be performed 10 times.

cific method for performing the shear test will be described hereunder referring to FIG. 4.

First, two metal plates (for example, carbon steel plates) 28 and 30 each having a length of 75 mm, a width of 25 mm, and a thickness of 0.8 mm were prepared, and a solid lubricating coating 32 having a thickness of 50 was formed in a region of 25 mm×25 mm between the two metal plates. More specifically, sheets 34 and 36 made of PTFE having a thickness of 50 μm were interposed at predetermined posi-

TABLE 2

| | Number | Galling Occurrence Situation 1) (Numerical value: tightening times) | | | | | | | | | | Salt Spray Test (JIS Z2371: 2000) (1,000 hours) 2) | Shear Test (adhesive strength kPa) | | Low Temperature-Outdoor Exposure Test | Over-torque Performance (%) (Relative to Inventive Example 3 of Present |
|---|---|---|---|---|---|---|---|---|---|---|---|---|---|---|---|---|
| | | 1 | 2 | 3 | 4 | 5 | 6 | 7 | 8 | 9 | 10 | | 25° C. | −40° C. 3) | | Invention) |
| Inventive Examples of Present Invention | 1 | ○ | ○ | ○ | ○ | ○ | ○ | ○ | ○ | ○ | ○ | No rust | 3700 | 3840 | No peeling of coating | — |
| | 2 | ○ | ○ | ○ | ○ | ○ | ○ | ○ | ○ | ○ | ○ | No rust | 4100 | 3100 | No peeling of coating | — |
| | 3 | ○ | ○ | ○ | ○ | ○ | ○ | ○ | ○ | ○ | ○ | No rust | 4800 | 3930 | No peeling of coating | 100 |
| | 4 | ○ | ○ | ○ | ○ | ○ | ○ | ○ | ○ | ○ | ○ | No rust | 5800 | 3750 | No peeling of coating | — |
| | 5 | ○ | ○ | ○ | ○ | ○ | ○ | ○ | Δ | Δ | Δ | No rust | 5500 | 1500 | Slight peeling of coating | — |
| | 6 | ○ | ○ | ○ | ○ | ○ | ○ | ○ | ○ | ○ | ○ | No rust | 5000 | 3550 | No peeling of coating | 120 |
| | 7 | ○ | ○ | ○ | ○ | ○ | ○ | ○ | ○ | ○ | ○ | No rust | 4800 | 3330 | No peeling of coating | 145 |
| | 8 | ○ | ○ | ○ | ○ | ○ | ○ | ○ | ○ | ○ | ○ | No rust | 4300 | 3120 | No peeling of coating | 180 |
| Comparative Examples | 1 | ○ | ○ | ○ | Δ | Δ | x | — | — | — | — | Small amount of rust after 1,000 hours | 1500 | 900 | Small amount of peeling of coating | — |
| | 2 | ○ | ○ | ○ | ○ | Δ | Δ | x | — | — | — | Small amount of rust after 1,001 hours | 1600 | 950 | Small amount of peeling of coating | — |
| | 3 | ○ | ○ | ○ | ○ | Δ | Δ | x | — | — | — | No rust | 2400 | 920 | Small amount of peeling of coating | — |
| | 4 | ○ | Δ | Δ | x | — | — | — | — | — | — | No rust | 4720 | 1410 | Slight peeling of coating | — |
| | 5 | ○ | Δ | x | — | — | — | — | — | — | — | No rust | 1880 | 730 | Large amount of peeling of coating | — |
| | 6 | ○ | ○ | Δ | Δ | x | — | — | — | — | — | No rust | 5800 | 1100 | Small amount of peeling of coating | — |

(Note)
1) ○: No occurrence of galling
Δ: Slight occurrence of galling (galling flaw was repaired and re-tightening was possible)
x: Significant occurrence of galling (not possible to repair)
—: Test terminated
2) Passes for practical use if no rust after 750 hours
3) Slight: peeling area percentage <1%
Small amount: peeling area percentage 5-10%
Large amount: peeling area percentage >10%

As shown in Table 2, a salt spray test was performed in conformity with JIS Z2371:2000. The result showed that there was no occurrence of rust in the Inventive Example 1 of the present invention even after 1,000 hours. Note that, with respect the present test, it is known from past experience that if the test piece is rust-free after 750 hours, the long-term rust prevention performance of the actual pipe is adequate.

In addition, a shear test was performed to measure the adhesive strength of the solid lubricating coating under conditions in which the ambient temperature was normal temperature (approximately 25° C.) and −40° C. The spetions between the metal plates 28 and 30 as sheets for setting the coating thickness, and after coating the composition for a solid lubricating coating that was heated to 120° C., the two metal plates were pressed together (in the vertical direction in FIG. 4) and cooled to thereby form the coating 32.

Figure 4:
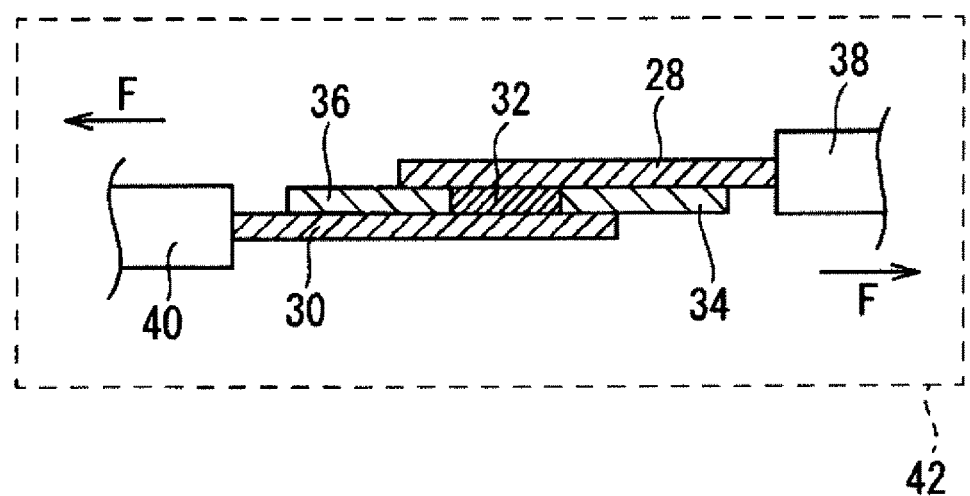
FIG. 4 is a schematic view of a shear test for measuring the adhesive strength of a solid lubricating coating.

Next, the PTFE sheets 34 and 36 were removed, one end of each of the metal plates 28 and 30 was gripped using suitable chucks 38 and 40, the entire structure was disposed inside a chamber 42 which is schematically illustrated in FIG. 4, and the structure was retained inside the chamber 42 at 25° C. or −40° C. In this state, the chucks 38 and 40 were moved at a speed of 50 min/min in directions away from each other in the longitudinal direction of the metal plates (that is, directions in which shear forces act on the coating 32), and a load F (kPa) when the coating 32 ruptured was measured. The result is shown in Table 2. It was confirmed that the adhesive strength of Inventive Example 1 of the present invention was markedly higher at both 25° C. and −40° C. in comparison to conventional Comparative Examples 1 and 2 which are described later. The pass line for the adhesive strength was taken as 1500 kPa or more at both 25° C. and −40° C.

Figure 5:
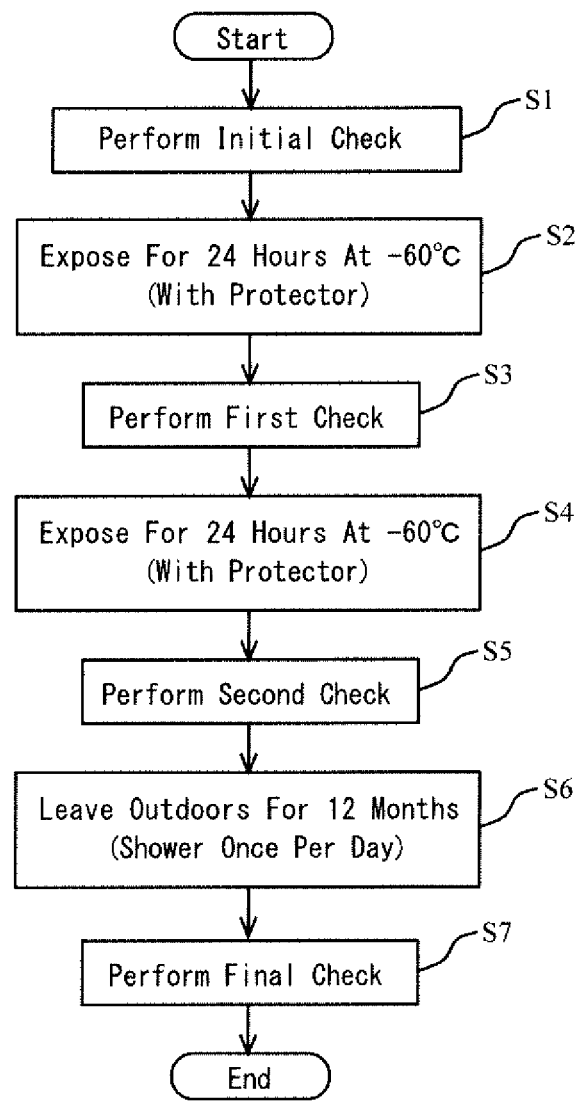
FIG. 5 is a flowchart illustrating steps of a low temperature-outdoor exposure test for a solid lubricating coating.

In addition, the degree of deterioration in the solid lubricating coating when exposed to an outdoor environment after being exposed to a cold temperature for a predetermined time was investigated (low temperature-outdoor exposure test) with respect to a threaded connection (box) on which the same solid lubricating coating as the coating when the tightening and loosening test was performed was actually formed. More specifically, as schematically illustrated in the flowchart in FIG. 5, first a check was performed to confirm there was no peeling or cracking of the solid lubricating coating of the threaded connection in an initial state (step S1). Next, the threaded connection was exposed for 24 hours to a low temperature of −60° C. in a state in which a protector was attached to the threaded connection (step S2). Thereafter, the protector was removed, and the state of peeling or cracking was checked (step S3). Next, a protector was attached to the threaded connection, and the threaded connection was again exposed for 24 hours to a low temperature of −60° C. (step S4). Thereafter, the protector was removed, and the state of peeling or cracking was checked (step S5). Finally, the threaded connection was left outdoors for one year during which time the threaded connection was showered with water at regular intervals (once per day) (step S6). The state of peeling and cracking caused by low temperature deterioration, that is, by a low temperature-ambient temperature cycle, of the solid lubricating coating of the threaded connection was then examined (step S7).

The results of the above described low temperature-outdoor exposure test are shown in Table 2. It was found that, with respect to Inventive Example 1 of the present invention, even when exposed for a total of 48 hours to the low temperature of −60° C., and furthermore being subjected to a temperature difference between a low temperature and ambient temperature, there was no occurrence of cracking, peeling or swelling (lifting of the coating) of the solid lubricating coating after the outdoor exposure for one year. Note that Table 2 shows the results of the above-described galling occurrence state, salt spray test, shear test and low temperature-outdoor exposure test for each of Inventive Example 1 of the present invention and Inventive Examples 2 to 8 of the present invention and Comparative Examples 1 to 6 that are described later.

Inventive Example 2 of the Present Invention

The following surface treatment was performed on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 8 μm (surface roughness of 8 μm). Furthermore, a coating composition prepared by adding 0.05 parts by mass of aluminum phosphite as a rust-preventing agent and 0.01 parts by mass of polyethylene wax as a lubricant to one part by mass of the resin content of an acrylic resin-based ultraviolet curing resin coating composition was applied as a composition for forming an ultraviolet curing resin coating onto the zinc phosphate coating of the pin surface and was irradiated with ultraviolet rays under the following conditions to cure the coating and form an ultraviolet cured resin coating having a thickness of 25 μm. The resulting solid anticorrosive coating was colorless and transparent, and the external thread parts could be inspected with the naked eye or with a magnifying glass from above the coating.

UV lamp: Air-cooled mercury vapor lamp,
UV lamp output: 4 kW,
Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to make the composition into a molten state having a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 50 μm was formed on the box surface.

The composition of the composition for forming a lubricating coating in Inventive Example 2 of the present invention was as follows.
(Binder)
  ethylene-vinyl acetate resin: 17%
  polyolefin resin: 12.2%
  wax (paraffin wax, fusing point 69° C.): 36.8%
(Fluorine Addition Agent)
  PFPE (perfluoropolyether): 10%
  fluorinated polymer: 7%
(Solid Lubricant)
  amorphous graphite (average particle diameter 7 μm): 10%
(Rust Proof Addition Agent)
  Ca ion-exchanged silica: 5%
  aluminum phosphite: 2%

For Inventive Example 2 of the present invention, a repeated tightening and loosening test was performed on the threaded connection in the same manner as in Inventive Example 1 of the present invention. The results are shown in the row for Inventive Example 2 of the present invention in Table 2. The results confirmed that various excellent effects similar to those of Inventive Example 1 of the present invention were obtained.

Inventive Example 3 of the Present Invention

With respect to the same type of thread as in Inventive Example 1 of the present invention, the pin surface and the box surface of a threaded connection (outer diameter: 24.448 cm (9⅝ inches), wall thickness: 1.105 cm (0.435 inches)) made of a 13Cr steel (C: 0.19%, Si: 0.25%, Mn: 0.9%, P: 0.02%, S: 0.01%, Cu: 0.04%, Ni: 0.11%, Cr: 13%, Mo: 0.04%, balance: iron and impurities) which is more susceptible to galling than carbon steel were subjected to the following surface treatment.

The pin surface was finished by machine grinding (surface roughness of 3 μm), and thereafter a coating composition prepared by adding 0.05 parts by mass of aluminum tripolyphosphate as a rust-preventing agent, 0.01 parts by mass of polyethylene wax as a lubricant, and 0.003 parts by mass of a fluorescent pigment to one part by mass of the resin content of an acrylic resin-based ultraviolet curing resin coating composition was applied as a composition for forming an ultraviolet curing resin coating onto the pin surface and irradiated with ultraviolet rays under the following conditions to cure the coating and form an ultraviolet cured resin coating having a thickness of 25 μm. The resulting coating was colorless and transparent, and the external thread parts could be inspected with the naked eye or with a magnifying glass from above the coating.

UV lamp: Air-cooled mercury vapor lamp,
UV lamp output: 4 kW,
Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 25 μm was formed on the box surface.

The composition of the composition for forming a lubricating coating in Inventive Example 3 of the present invention was as follows.
(Binder)
 ethylene-vinyl acetate resin: 22%
 polyolefin resin: 21%
 wax (paraffin wax, fusing point 69° C.): 31%
(Fluorine Addition Agent)
 PFPE (perfluoropolyether): 10%
 fluorinated polymer: 4%
(Solid Lubricant)
 PTFE: 10%
(Rust Proof Addition Agent)
 aluminum phosphite: 2%

For Inventive Example 3 of the present invention, a repeated tightening and loosening test was performed on the threaded connection in the same manner as in Inventive Example 1 of the present invention. The results are shown in the row for Inventive Example 3 of the present invention in Table 2. The results confirmed that various excellent effects similar to those of Inventive Examples 1 and 2 of the present invention were obtained.

Inventive Example 4 of the Present Invention

Using the same kind of threaded connection and steel grade as in Inventive Example 1 of the present invention, the pin and the box were subjected to the preconditioning treatment described in Inventive Example 2 of the present invention, and thereafter a composition for forming a lubricating coating having the following composition was heated at 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 30 μm was formed on the box surface.

The composition of the composition for forming a lubricating coating in Inventive Example 4 of the present invention was as follows.
(Binder)
 ethylene-vinyl acetate resin: 26%
 polyolefin resin: 16%
 wax (paraffin wax, fusing point 69° C.): 37%
(Fluorine Addition Agent)
 PFPE (perfluoropolyether): 9%
(Solid Lubricant)
 amorphous graphite (average particle diameter 7 μm): 5%
 graphite fluoride (CFx): 4%
(Rust Proof Addition Agent)
 aluminum phosphite: 3%

For Inventive Example 4 of the present invention, a repeated tightening and loosening test was performed on the threaded connection in the same manner as in Inventive Example 1 of the present invention. The results are shown in the row for Inventive Example 4 of the present invention in Table 2. The results confirmed that various excellent effects similar to those of Inventive Examples 1 to 3 of the present invention were obtained.

Inventive Example 5 of the Present Invention

Using the same kind of threaded connection and steel grade as in Inventive Example 1 of the present invention, the pin and the box were subjected to the preconditioning treatment described in Inventive Example 2 of the present invention, and thereafter a composition for forming a lubricating coating having the following composition was heated at 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 30 μm was formed on the box surface.

The composition of the composition for forming a lubricating coating in Inventive Example 5 of the present invention was as follows.
(Binder)
 ethylene-vinyl acetate resin: 21.6%
 polyolefin resin: 16%
 wax (polyethylene wax, fusing point 110° C.): 32.4%
(Fluorine Addition Agent)
 PFPE (perfluoropolyether): 10%
 fluorinated polymer: 4%
(Solid Lubricant)
 amorphous graphite (average particle diameter 7 μm): 5%
 graphite fluoride (CFx): 4%
(Rust Proof Addition Agent)
 Ca Ion-Exchanged Silica: 5%
 aluminum phosphite: 2%

For Inventive Example 5 of the present invention, a repeated tightening and loosening test was performed on the threaded connection in the same manner as in Inventive Example 1 of the present invention. The results are shown in the row for Inventive Example 5 of the present invention in Table 2. In comparison to Inventive Examples 3 and 4 of the present invention, perhaps because the sum of the mass ratios of the binder was the low amount of 70%, although the adhesive strength in the shear test at 25° C. was adequate, the adhesive strength in the shear test at −40° C. was somewhat low. In Inventive Example 5 of the present invention, the difference between the adhesive strength in the vicinity of normal temperature and the adhesive strength in an extremely low temperature environment was increased. In addition, although there was no occurrence of galling up to the seventh tightening in the tightening and loosening test at −40° C., light galling occurred on the thread parts on the eighth tightening, and this galling was repaired and the test was completed up to the tenth tightening. Further, with respect to the low temperature-outdoor exposure test also, although there was no occurrence of cracking or peeling even when the threaded connection was exposed to a low temperature or was subjected to a temperature difference between a low temperature and ambient temperature, it was observed that light peeling (lifting of the coating) of the solid lubricating coating was occurring after the outdoor exposure test for one year. However, the peeling was of a level that did not represent a problem for actual use.

Inventive Example 6 of the Present Invention

Using the same kind of threaded connection and steel grade as in Inventive Example 1 of the present invention, the pin and the box were subjected to the preconditioning treatment described in Inventive Example 2 of the present invention, and thereafter a composition for forming a lubricating coating having the following composition was heated at 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 30 µm was formed on the box surface.

The composition of the composition for forming a lubricating coating in Inventive Example 6 of the present invention was as follows.
(Binder)
  ethylene-vinyl acetate resin: 20.5%
  polyolefin resin: 19.5%
  wax (polyethylene wax, fusing point 78° C.): 36%
(Fluorine Addition Agent)
  PFPE (perfluoropolyether): 8%
(Solid Lubricant)
  amorphous graphite (average particle diameter 7 µm): 7%
(Rust Proof Addition Agent)
  Ca ion-exchanged silica: 3%
  aluminum phosphite: 4%
(Friction Modifier)
  talc (particle size 4.5 µm, specific surface area 9.5 m²/g): 2%

The particle size of the talc was determined in the above described manner using a laser diffraction particle size analyzer (manufactured by Shimadzu Corp., SALD-2000J). The specific surface area of the talc was determined in the above described manner.

For Inventive Example 6 of the present invention, a repeated tightening and loosening test was performed on the threaded connection in the same manner as in Inventive Example 1 of the present invention. The results are shown in the row for Inventive Example 6 of the present invention in Table 2. The results confirmed that various excellent effects similar to those of Inventive Examples 1 to 4 of the present invention were obtained.

For Inventive Example 6 of the present invention, the difference between the yield torque and the shouldering torque was also measured as follows. A threaded connection sample was prepared, and was fastened using a suitable torque wrench. After fastening, torque was applied again to perform tightening, and the torque chart illustrated in FIG. 6 was then prepared. The shouldering torque, the yield torque, and the difference between the yield torque and the shouldering torque were measured on the torque chart. The shouldering torque is a torque value at a time when shoulder parts contact and a torque change began to separate from a first linear region (elastic deformation region). In contrast, the yield torque is a torque value at a time when a plastic deformation begins. More specifically, the yield torque is a torque value at a time when a separation from a second linear region begins, which occurs after the shouldering torque was reached. The result is shown in the row for Inventive Example 6 of the present invention in Table 2. When the difference between the yield torque and the shouldering torque of Inventive Example 3 of the present invention is taken as 100, the difference between the yield torque and the shouldering torque of Inventive Example 6 of the present invention is 120, indicating excellent over-torque performance.

Inventive Example 7 of the Present Invention

Using the same kind of threaded connection and steel grade as in Inventive Example 1 of the present invention, the pin and the box were subjected to the preconditioning treatment described in Inventive Example 2 of the present invention, and thereafter a composition for forming a lubricating coating having the following composition was heated at 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 30 µm was formed on the box surface.

The composition of the composition for forming a lubricating coating in Inventive Example 7 of the present invention was as follows.
(Binder)
  ethylene-vinyl acetate resin: 20.5%
  polyolefin resin: 19.5%
  wax (polyethylene wax, fusing point 78° C.): 33%
(Fluorine Addition Agent)
  PFPE (perfluoropolyether): 8%
(Solid Lubricant)
  amorphous graphite (average particle diameter 7 µm): 7%
(Rust Proof Addition Agent)
  Ca ion-exchanged silica: 3%
  aluminum phosphite: 4%

(Friction Modifier)
  talc (particle size 3.3 μm, specific surface area 12.0 m²/g): 5%

The particle size and specific surface area of the talc were measured in the same manner as in Inventive Example 6 of the present invention.

For Inventive Example 7 of the present invention, a repeated tightening and loosening test was performed on the threaded connection in the same manner as in Inventive Example 1 of the present invention. The results are shown in the row for Inventive Example 7 of the present invention in Table 2. The results confirmed that various excellent effects similar to those of Inventive Examples 1 to 4 of the present invention and Inventive Example 6 of the present invention were obtained.

For Inventive Example 7 of the present invention, the difference between the yield torque and the shouldering torque was also measured in the same manner as in Inventive Example 6 of the present invention. The result is shown in the row for Inventive Example 7 of the present invention in Table 2. When the difference between the yield torque and the shouldering torque of Inventive Example 3 of the present invention is taken as 100, the difference between the yield torque and the shouldering torque of Inventive Example 7 of the present invention is 145, indicating excellent over-torque performance.

Inventive Example 8 of the Present Invention

Using the same kind of threaded connection and steel grade as in Inventive Example 1 of the present invention, the pin and the box were subjected to the preconditioning treatment described in Inventive Example 2 of the present invention, and thereafter a composition for forming a lubricating coating having the following composition was heated at 120° C. in a tank equipped with a stirring mechanism to form a composition having a base in a molten state with a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 30 μm was formed on the box surface.

The composition of the composition for forming a lubricating coating in Inventive Example 8 of the present invention was as follows.
(Binder)
  ethylene-vinyl acetate resin: 20.5%
  polyolefin resin: 19.5%
  wax (polyethylene wax, fusing point 78° C.): 32%
(Fluorine Addition Agent)
  PFPE (perfluoropolyether): 8%
(Solid Lubricant)
  amorphous graphite (average particle diameter 7 μm): 7%
(Rust Proof Addition Agent)
  Ca ion-exchanged silica: 3%
  aluminum phosphite: 4%
(Friction Modifier)
  talc (particle size 8.0 μm, specific surface area 7.0 m²/g): 6%

The particle size and specific surface area of the talc were measured in the same manner as in Inventive Example 6 of the present invention.

For Inventive Example 8 of the present invention, a repeated tightening and loosening test was performed on the threaded connection in the same manner as in Inventive Example 1 of the present invention. The results are shown in the row for Inventive Example 8 of the present invention in Table 2. The results confirmed that various excellent effects similar to those of Inventive Examples 1 to 4 of the present invention and Inventive Examples 6 to 7 of the present invention were obtained.

For Inventive Example 8 of the present invention, the difference between the yield torque and the shouldering torque was also measured in the same manner as in Inventive Example 6 of the present invention. The result is shown in the row for Inventive Example 8 of the present invention in Table 2. When the difference between the yield torque and the shouldering torque of Inventive Example 3 of the present invention is taken as 100, the difference between the yield torque and the shouldering torque of Inventive Example 8 of the present invention is 180, indicating excellent over-torque performance.

Comparative Example 1

The following surface treatment was performed on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 10 μm (surface roughness of 8 μm). The box surface was finished by machine grinding (surface roughness of 3 μm) and thereafter immersed for 10 minutes in a manganese phosphating solution at 80 to 95° C. to form a manganese phosphate coating (surface roughness of 10 μm) with a thickness of 12 μm.

A composition for forming a solid lubricating coating having the following composition was heated to 130° C. inside a tank equipped with a stirring mechanism to make the composition into a molten state having a viscosity suitable for coating, and after the pin surface and box surface which had undergone the above-described preconditioning treatment were preheated to 140° C. by induction heating, the composition for forming a solid lubricating coating described under Inventive Example 1 of the present invention in Table 1 having a base resin in a molten state was applied onto both of the pin surface and box surface using a spray gun having a spraying head with a temperature maintaining function. After cooling, a solid lubricating coating having an average thickness of 50 μm was formed on the pin surface and box surface.

A composition corresponding to "Example" described on page 18 of Patent Literature 3 was used as the composition of the composition for forming a lubricating coating in Comparative Example 1.

For Comparative Example 1, a repeated tightening and loosening test was performed on the threaded connection in the same manner as in Inventive Example 1 of the present invention. The results are shown in the row for Comparative Example 1 in Table 2. Although no galling occurred up to the third tightening, light galling occurred on the thread parts on the fourth tightening, and this galling was repaired and testing was performed up to the fifth tightening. However, on the sixth tightening, galling occurred to a degree that could not be repaired, and consequently the test was terminated.

It was found that with the conventional solid lubricating coating as used in Comparative Example 1, even though the tightening and loosening test could be performed 5 times at ambient temperature (−10 to 30° C.), the performance declined significantly at −40° C. Further, although there were no practical problems with respect to the salt spray test, a small quantity of rust had arisen at 1,000 hours. That is, it was found that the invention of the present application also significantly improves a rust preventing property in comparison to the prior art. It was also found that the adhesive strength in the shear test was significantly lower than in the inventive examples of the present invention, and in particular the adhesive strength at −40° C. was an extremely low value of less than 1,000 kPa.

Furthermore, with respect to Comparative Example 1, in the low temperature-outdoor exposure test, when the protector was removed at ambient temperature after the threaded connection was exposed for 24 hours at the low temperature of −60° C., slight peeling of the coating had occurred. In addition, when the threaded connection was again exposed for 24 hours at −60° C., the peeling area increased, and peeling (lifting of the coating) of 5 to 10% of the solid lubricating coating was observed after the threaded connection was subjected to outdoor exposure for one year.

Comparative Example 2

The following surface treatment was performed in a similar manner as in Comparative Example 1 on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 10 μm (surface roughness of 8 μm). The box surface was finished by machine grinding (surface roughness of 3 μm) and thereafter immersed for 10 minutes in a manganese phosphating solution at 80 to 95° C. to form a manganese phosphate coating (surface roughness of 10 μm) with a thickness of 12 μm.

A composition for forming a solid lubricating coating having the following composition was heated to 130° C. inside a tank equipped with a stirring mechanism to make the composition into a molten state having a viscosity suitable for coating, and after the pin surface and box surface which had undergone the above-described preconditioning treatment were preheated to 140° C. by induction heating, the composition for forming a solid lubricating coating described under Inventive Example 1 of the present invention in Table 1 having a base resin in a molten state was applied onto both of the pin surface and box surface using a spray gun having a spraying head with a temperature maintaining function. After cooling, a solid lubricating coating having an average thickness of 50 μm was formed on the pin surface and box surface.

A composition corresponding to "Inventive Example 1 of the present invention" described on pages 20 to 21 of Patent Literature 4 was used as the composition of the composition for forming a lubricating coating in Comparative Example 2.

For Comparative Example 2, a repeated tightening and loosening test was performed on the threaded connection in the same manner as in Inventive Example 1 of the present invention. The results are shown in the row for Comparative Example 2 in Table 2. Although no galling occurred up to the fourth tightening, light galling occurred on the thread parts on the fifth tightening, and this galling was repaired and testing was performed up to the sixth tightening. However, on the seventh tightening, galling occurred to a degree that could not be repaired, and consequently the test was terminated.

It was found that with the conventional solid lubricating coating as used in Comparative Example 2, even though the tightening and loosening test could be performed 10 times at ambient temperature (−10 to 30° C.), the performance declined significantly at −40° C. Further, although there were no practical problems with respect to the salt spray test, a small quantity of rust had arisen at 1,000 hours. That is, it was found that the invention of the present application also significantly improves a rust preventing property in comparison to the prior art. It was also found that the adhesive strength in the shear test was significantly lower than in the inventive examples of the present invention, and in particular the adhesive strength at −40° C. was an extremely low value of less than 1,000 kPa.

Furthermore, with respect to Comparative Example 2, in the low temperature-outdoor exposure test, when the protector was removed at ambient temperature after the threaded connection was exposed for 24 hours at the low temperature of −60° C., slight peeling of the coating had occurred. In addition, when the threaded connection was again exposed for 24 hours at −60° C., the peeling area increased, and peeling (lifting of the coating) of 5 to 10% of the solid lubricating coating was observed after the threaded connection was subjected to outdoor exposure for one year.

Comparative Example 3

The following surface treatment was performed in a similar manner as in Inventive Example 2 of the present invention on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 8 μm (surface roughness of 8 μm). Furthermore, a coating composition prepared by adding 0.05 parts by mass of aluminum phosphite as a rust-preventing agent and 0.01 parts by mass of polyethylene wax as a lubricant to one part by mass of the resin content of an acrylic resin-based ultraviolet curing resin coating composition was applied as a composition for forming an ultraviolet curing resin coating onto the zinc phosphate coating of the pin surface and was irradiated with ultraviolet rays under the following conditions to cure the coating and form an ultraviolet cured resin coating having a thickness of 25 μm. The resulting solid anticorrosive coating was colorless and transparent, and the external thread parts could be inspected with the naked eye or with a magnifying glass from above the coating.

UV lamp: Air-cooled mercury vapor lamp,
UV lamp output: 4 kW,
Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to make the composition into a molten state having a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 35 μm was formed on the box surface.

The composition of the composition for forming a lubricating coating in Comparative Example 3 was as follows.
(Binder)
 ethylene-vinyl acetate resin: 13.5%
 polyolefin resin: 15%
 wax (paraffin wax, fusing point 69° C.): 26.5%
(Fluorine Addition Agent)
 PFPE (perfluoropolyether): 10%
 fluorinated polymer: 4%
(Solid Lubricant)
 amorphous graphite (average particle diameter 7 μm): 5%
 graphite fluoride (CFx): 4%
(Rust Proof Addition Agent)
 Calcium sulfonate derivative: 15%
 Ca ion-exchanged silica: 5%
 aluminum phosphite: 2%

For Comparative Example 3, a repeated tightening and loosening test was performed on the threaded connection in the same manner as in Inventive Example 1 of the present invention. The results are shown in the row for Comparative Example 3 in Table 2. Although no galling occurred up to the fourth tightening, light galling occurred on the thread parts on the fifth tightening, and this galling was repaired and testing was performed up to the sixth tightening. However, on the seventh tightening, galling occurred to a degree that could not be repaired, and consequently the test was terminated.

It was also found that the adhesive strength in the shear test was significantly lower than in the inventive examples of the present invention, and in particular the adhesive strength at −40° C. was an extremely low value of less than 1,000 kPa. Furthermore, in the low temperature-outdoor exposure test, peeling (lifting of the coating) of 5 to 10% of the solid lubricating coating was observed after the threaded connection was subjected to outdoor exposure for one year.

Thus, it was found that when EVA/PO is less than 1.0 and the sum of the mass ratios of the binder is 60% or less, the adhesive strength is markedly lower at −40° C. in particular, and as a result not only does the low temperature-outdoor exposure test cause peeling of the coating, but the galling resistance at the time of the tightening and loosening test also decreases significantly.

Comparative Example 4

The following surface treatment was performed in a similar manner as in Inventive Example 2 of the present invention on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 8 μm (surface roughness of 8 μm). Furthermore, a coating composition prepared by adding 0.05 parts by mass of aluminum phosphite as a rust-preventing agent and 0.01 parts by mass of polyethylene wax as a lubricant to one part by mass of the resin content of an acrylic resin-based ultraviolet curing resin coating composition was applied as a composition for forming an ultraviolet curing resin coating onto the zinc phosphate coating of the pin surface and was irradiated with ultraviolet rays under the following conditions to cure the coating and form an ultraviolet cured resin coating having a thickness of 25 μm. The resulting solid anticorrosive coating was colorless and transparent, and the external thread parts could be inspected with the naked eye or with a magnifying glass from above the coating.
 UV lamp: Air-cooled mercury vapor lamp,
 UV lamp output: 4 kW,
 Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to make the composition into a molten state having a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 35 μm was formed on the box surface.

The composition of the composition for forming a lubricating coating in Comparative Example 4 was as follows.
(Binder)
 ethylene-vinyl acetate resin: 25.5%
 polyolefin resin: 14%
 wax (paraffin wax, fusing point 69° C.): 31.5%
(Fluorine Addition Agent)
 PFPE (perfluoropolyether): 10%
 fluorinated polymer: 4%
(Solid Lubricant)
 amorphous graphite (average particle diameter 7 μm): 5%
 graphite fluoride (CFx): 4%
(Rust Proof Addition Agent)
 Ca ion-exchanged silica: 5%
 aluminum phosphite: 2%

For Comparative Example 4, a repeated tightening and loosening test was performed on the threaded connection in the same manner as in Inventive Example 1 of the present invention. The results are shown in the row for Comparative Example 4 in Table 2. Although no galling occurred on the first tightening, light galling occurred on the thread parts on the second tightening, and this galling was repaired and testing was performed up to the third tightening. However, at the fourth tightening, galling occurred to a degree that could not be repaired, and consequently the test was terminated.

For Comparative Example 4 also, it was found that the adhesive strength in the shear test was significantly lower than in the inventive examples of the present invention, and in particular the adhesiveness at −40° C. was low. However, since Comparative Example 4 exhibited high adhesive strength in comparison to Comparative Examples 1 to 3, in the low temperature-outdoor exposure test, after outdoor exposure for one year the amount of peeling (lifting of the coating) of the solid lubricating coating that had occurred stayed at a level of less than 1%. However, it was found that when EVA/PO is more than 1.8, the galling resistance at the time of the tightening and loosening test declines. The reason for this is presumed to be that the coating becomes hard when EVA/PO is more than 1.8, and consequently the sliding resistance of the coating increases and hinders the lubricity.

Comparative Example 5

The following surface treatment was performed in a similar manner as in Inventive Example 2 of the present invention on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 8 μm (surface roughness of 8 pin). Furthermore, a coating composition prepared by adding 0.05 parts by mass of aluminum phosphite as a rust-preventing agent and 0.01 parts by mass of polyethylene wax as a lubricant to one part by mass of the resin content of an acrylic resin-based ultraviolet curing resin coating composition was applied as a composition for forming an ultraviolet curing resin coating onto the zinc phosphate coating of the pin surface and was irradiated with ultraviolet rays under the following conditions to cure the coating and form an ultraviolet cured resin coating having a thickness of 25 μm. The resulting solid anticorrosive coating was colorless and transparent, and the external thread parts could be inspected with the naked eye or with a magnifying glass from above the coating.

UV lamp: Air-cooled mercury vapor lamp,
UV lamp output: 4 kW,
Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to make the composition into a molten state having a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 35 μm was formed on the box surface.

The composition of the composition for forming a lubricating coating in Comparative Example 5 was as follows.
(Binder)
  ethylene-vinyl acetate resin: 13.5%
  polyolefin resin: 10%
  wax (paraffin wax, fusing point 69° C.): 46.5%
(Fluorine Addition Agent)
  PFPE (perfluoropolyether): 10%
  fluorinated polymer: 4%
(Solid Lubricant)
  amorphous graphite (average particle diameter 7 μm): 5%
  graphite fluoride (CFx): 4%
(Rust Proof Addition Agent)
  Ca ion-exchanged silica: 5%
  aluminum phosphite: 2%

For Comparative Example 5, a repeated tightening and loosening test was performed on the threaded connection in the same manner as in Inventive Example 1 of the present invention. The results are shown in the row for Comparative Example 5 in Table 2. Although no galling occurred on the first tightening, light galling occurred on the thread parts on the second tightening, and this galling was repaired and testing was continued. However, on the third tightening, galling occurred to a degree that could not be repaired, and consequently the test was terminated.

For Comparative Example 5 also, it was found that the adhesive strength in the shear test was significantly lower than in the inventive examples of the present invention, and in particular the adhesiveness at −40° C. was low. Furthermore, in the low temperature-outdoor exposure test, when the protector was removed at ambient temperature after the threaded connection was exposed for 24 hours at the low temperature of −60° C., slight peeling of the coating had occurred. In addition, when the threaded connection was again exposed for 24 hours at −60° C., the peeling area increased, and peeling (lifting of the coating) of more than 10% of the solid lubricating coating was observed after the threaded connection was subjected to outdoor exposure for one year.

When (EVA+PO)/W is less than 0.7, as in Comparative Example 5, the overall adhesive strength decreases and, in particular, there is a marked decline in the adhesive strength at −40° C. As a result, it was found that peeling of the coating caused by the low temperature-outdoor exposure test is noticeable, and the galling resistance at the time of the tightening and loosening test also decreases significantly. The reason for this is presumed to be that when (EVA+PO)/W is less than 0.7 the coating becomes too soft and consequently the adhesive strength decreases to an extreme degree, and furthermore the lubricity cannot be maintained during a repeated tightening and loosening test.

Comparative Example 6

The following surface treatment was performed in a similar manner as in Inventive Example 2 of the present invention on a pin surface and a box surface of a threaded connection made of carbon steel that was the same as that used in Inventive Example 1 of the present invention.

The pin surface was finished by machine grinding (surface roughness of 3 μm) and thereafter immersed for 10 minutes in a zinc phosphating solution at 75 to 85° C. to form a zinc phosphate coating with a thickness of 8 mm (surface roughness of 8 μm). Furthermore, a coating composition prepared by adding 0.05 parts by mass of aluminum phosphite as a rust-preventing agent and 0.01 parts by mass of polyethylene wax as a lubricant to one part by mass of the resin content of an acrylic resin-based ultraviolet curing resin coating composition was applied as a composition for forming an ultraviolet curing resin coating onto the zinc phosphate coating of the pin surface and was irradiated with ultraviolet rays under the following conditions to cure the coating and form an ultraviolet cured resin coating having a thickness of 25 μm. The resulting solid anticorrosive coating was colorless and transparent, and the external thread parts could be inspected with the naked eye or with a magnifying glass from above the coating.

UV lamp: Air-cooled mercury vapor lamp,
UV lamp output: 4 kW,
Wavelength of ultraviolet rays: 260 nm.

The box surface was finished by machine grinding (surface roughness of 3 μm) and thereafter subjected to electrolytic plating first by Ni strike plating and then by Cu—Sn—Zn alloy plating to form a plated coating having a total thickness of 8 μm. Thereafter, a composition for forming a lubricating coating having the following composition was heated to 120° C. in a tank equipped with a stirring mechanism to make the composition into a molten state having a viscosity suitable for coating. After the box surface which underwent the above-described preconditioning treatment was also preheated to 130° C. by induction heating, the molten composition for forming a solid lubricating coating was applied onto the preheated box surface using a spray gun having a spray head with a temperature maintaining function. After cooling, a solid lubricating coating having an average thickness of 35 μm was formed on the box surface.

The composition of the composition for forming a lubricating coating in Comparative Example 6 was as follows.
(Binder)
  ethylene-vinyl acetate resin: 27%
  polyolefin resin: 20%
  wax (paraffin wax, fusing point 69° C.): 23%
(Fluorine Addition Agent)
  PFPE (perfluoropolyether): 10%
  fluorinated polymer: 4%
(Solid Lubricant)
  amorphous graphite (average particle diameter 7 μm): 5%
  graphite fluoride (CFx): 4%
(Rust Proof Addition Agent)
  Ca ion-exchanged silica: 5%
  aluminum phosphite: 2%

For Comparative Example 6, a repeated tightening and loosening test was performed on the threaded connection in the same manner as in Inventive Example 1 of the present invention. The results are shown in the row for Comparative Example 6 in Table 2. Although no galling occurred up to the second tightening, light galling occurred on the thread parts on the third tightening, and this galling was repaired and testing was continued up to the fourth tightening. However, on the fifth tightening, galling occurred to a degree that could not be repaired, and consequently the test was terminated.

Further, it was found that the adhesive strength at −40° C. in the shear test was significantly low compared to the inventive examples of the present invention. In addition, a difference between the adhesive strength in the vicinity of normal temperature and the adhesive strength in an extremely low temperature environment was remarkably large. In the low temperature-outdoor exposure test, when the protector was removed at ambient temperature after the threaded connection was exposed for 24 hours at the low temperature of −60° C., slight peeling of the coating had occurred. In addition, when the threaded connection was again exposed for 24 hours at −60° C., the peeling area increased, and peeling (lifting of the coating) of 5 to 10% of the solid lubricating coating was observed after the threaded connection was subjected to outdoor exposure for one year.

It was found that when (EVA+PO)/W is significantly more than 1.6, as in Comparative Example 6, the adhesive strength at −40° C. decreases, and due to peeling of the coating at the time of a low temperature in the low temperature-outdoor exposure test, the galling resistance at the time of the tightening and loosening test also decreases significantly. It is considered that the reason for this is that the coating becomes hard when (EVA+PO)/W is more than 1.6, and although the adhesive strength at ambient temperature increases, there is little improvement in the adhesive strength at −40° C., and because the sliding resistance of the coating increases and hinders the lubricity, the galling resistance at the time of the tightening and loosening test is low.

Although a threaded connection for pipe or tube with an outer diameter of 24.448 cm (9⅝ inches) has been described in the above examples, it was verified that similar advantageous effects are also obtained with respect to threaded connections with outer diameters from 2⅜ inches to 14 inches, steel grades from carbon steel to 13Cr steel and even high alloy steel (for example, 25Cr steel), and various thread types (integral connections such as VAM® Connection, VAM® TOP series, and VAM® SLIJ 11 that are manufactured by Nippon Steel & Sumitomo Metal Corporation).

[Flat-Plate Sliding Test]

Figure 6:
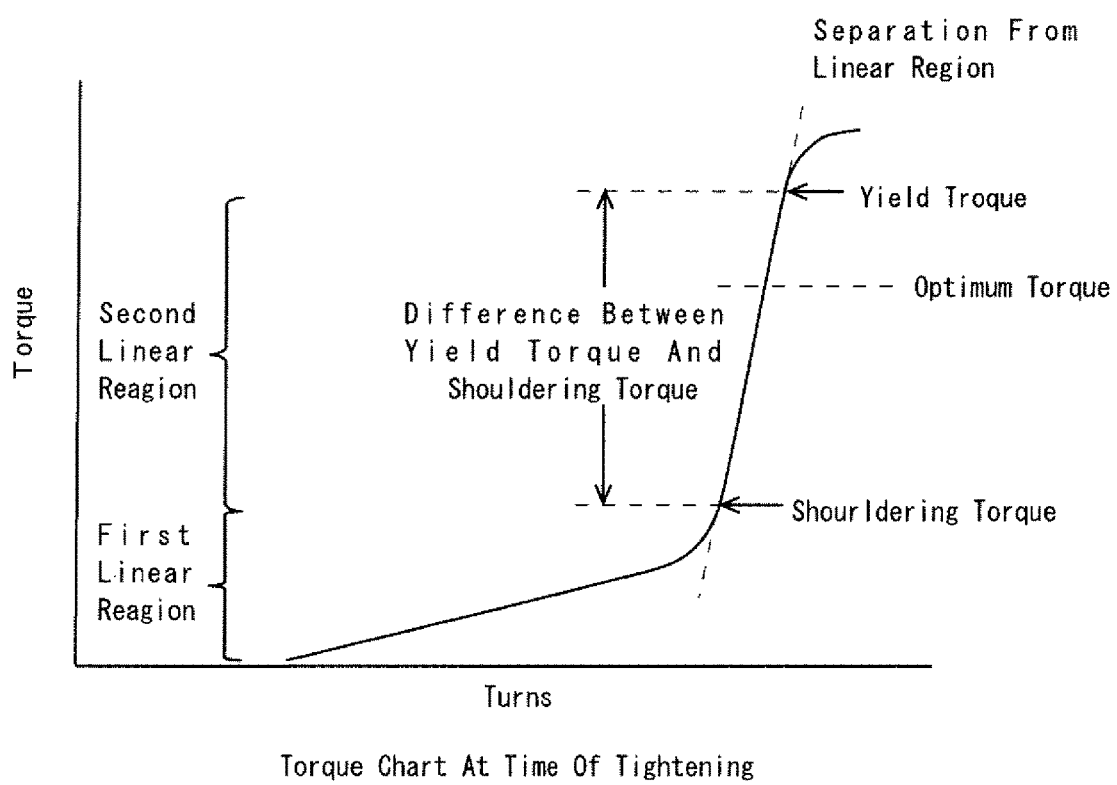
FIG. 6 is a view illustrating the relation between the rotation number of the threaded connection and the torque.
Figure 7:
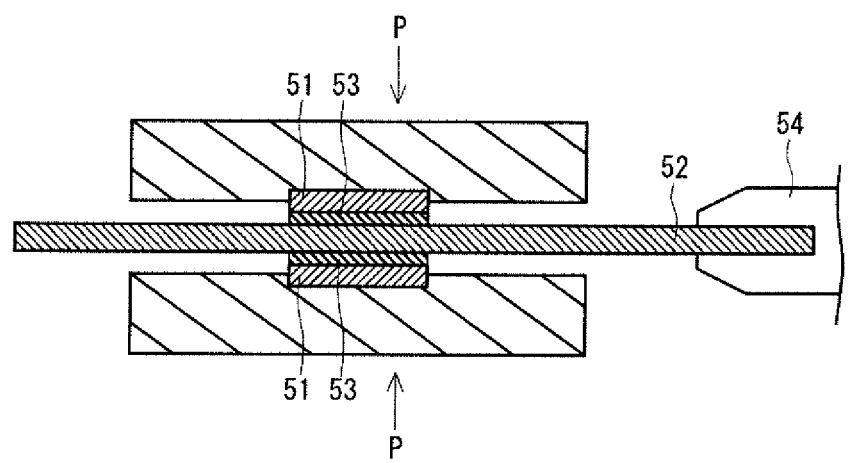
FIG. 7 is a schematic view of a flat-plate sliding test for measuring a coefficient of friction.

A flat-plate sliding test was performed to investigate the relationship between the content of talc in a solid lubricating coating and a coefficient of friction when fastening a threaded connection. Specifically, the apparatus illustrated in FIG. 6 was used. FIG. 6 is a view that illustrates an overview of the flat-plate sliding test for measuring the coefficient of friction. Steel plates 51 shown in FIG. 6 were made of 13Cr steel that is the same as the steel used for Inventive Example 3 of the present invention, and had a width of 10 mm and a length of 25 mm. A steel plate 52 was made of the same 13Cr steel as in Inventive Example 3 of the present invention. An ultraviolet curing resin coating was formed on the surface of the steel plate 52 in a similar manner to the ultraviolet curing resin coating formed on the pin surface of Inventive Example 3 of the present invention. A solid lubricating coating 53 was formed on the surface of each of the steel plates 51 after the surface had undergone Cu—Sn—Zn alloy plating, similarly to the box surface of Inventive Example 3 of the present invention. The contents of the composition of the solid lubricating coating 53 were the same as the solid lubricating coating in Inventive Example 6 of the present invention except for the talc content, and only the talc content was varied between 1 and 20%. The steel plate 52 was mounted in the apparatus so as to be interposed between the two steel plates 51 in the vertical direction, and one end of the steel plate 52 was gripped using a suitable chuck 54. The steel plate 52 was slid in the horizontal direction in a state in which a pressure P was applied in the vertical direction to the flat plate faces of the steel plate. The pressure P in the vertical direction was 17.5 kgf/mm$^2$ with respect to the steel plates 51 and 52. The sliding distance of the steel plate 52 was 50 mm and the sliding speed was 10 mm/s. The coefficient of friction became constant after approximately 10 seconds had elapsed after the start of sliding. The coefficient of friction was measured at a time point at which approximately 30 seconds had elapsed after the start of sliding. The results are shown in Table 3.

TABLE 3

| Content of talc in solid lubricating coating (%) | Coefficient of friction (μ) |
|---|---|
| 1.0 | 0.09 |
| 2.0 | 0.28 |
| 3.3 | 0.30 |
| 4.5 | 0.31 |
| 8.0 | 0.32 |
| 10.0 | 0.34 |
| 13.0 | 0.35 |
| 15.0 | 0.36 |
| 17.0 | 0.47 |
| 20.0 | 0.58 |

Figure 8:
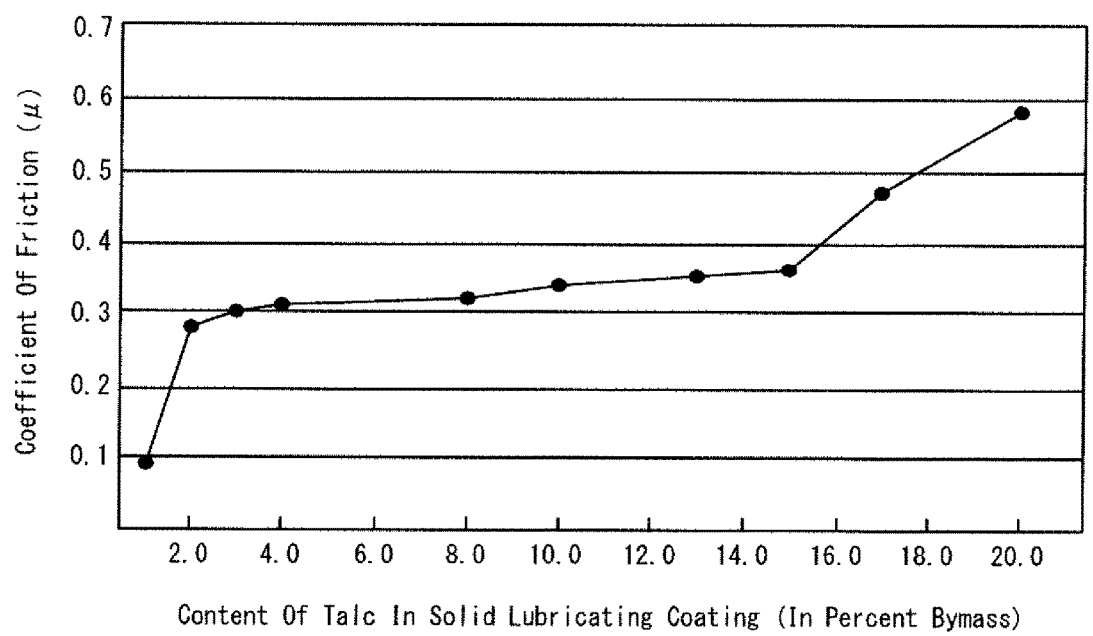
FIG. 8 is a view illustrating the relation between the content of talc in a solid lubricating coating and the coefficient of friction.

FIG. 8 illustrates the relation between the content of talc in a solid lubricating coating and the coefficient of friction. Referring to Table 3 and FIG. 8, it was found that when the content of talc in the solid lubricating coating was 2 to 15% by mass, the coefficient of friction stably transitioned in the vicinity of 0.30 to 0.35. It is considered that when the content of talc in a solid lubricating coating is 2 to 15% by mass, the coefficient of friction can be maintained at a suitable level even if an interfacial pressure with respect to the radial direction of the threaded connection is high. When the content of talc was more than 15% by mass, the coefficient of friction increased significantly. Since galling occurs if the coefficient of friction is too high, the significant increase of the coefficient of friction is not preferable. Accordingly, a talc content of 15% by mass or less is suitable.

Although the present invention has been described above with respect to embodiments which are currently thought to be preferable, the present invention is not limited to the above disclosed embodiments. It is possible to make variations within a scope which is not contrary to the technical concept of the invention construed from the claims and the overall description, and a threaded connection which incorporates such changes should be understood as being encompassed by the technical scope of the present invention.

INDUSTRIAL APPLICABILITY

The present invention is not limited to the steel pipes described in the examples, and can also be applied to threaded connections used for pipes that are used for other than oil well pipes.

REFERENCE SIGNS LIST

2 Steel pipe
4 External thread part
6 Pin
8 Coupling
10 Internal thread part
12 Box
14, 16 Seal part
18, 20 Shoulder part
22 Steel
24 Solid lubricating coating
26 Preconditioning treatment coating

The invention claimed is:
1. A composition for forming a solid lubricating coating on a threaded connection for pipe or tube, by comprising:
 a binder,
 a fluorine addition agent
 a solid lubricant, and
 a rust proof addition agent;
 characterized in that:
the binder comprises:
 an ethylene-vinyl acetate resin,
 a polyolefin resin, and
 a wax having a fusing point of 110° C. or less;
a ratio of a mass of the ethylene-vinyl acetate resin to a mass of the polyolefin resin is from 1.0 to 1.8; and
a ratio of a total mass of the polyolefin resin and the ethylene-vinyl acetate resin to a mass of the wax is from 0.7 to 1.6.
 2. The composition according to claim 1, comprising:
 60 to 80% by mass of the binder,
 8 to 18% by mass of the fluorine addition agent,
 5 to 15% by mass of the solid lubricant, and
 2 to 10% by mass of the rust proof addition agent.
 3. The composition according to claim 1, further comprising 2 to 15% by mass of talc.
 4. The composition according to claim 2, further comprising 2 to 15% by mass of talc.
 5. The composition according to claim 3, wherein
 a particle size of the talc is 1 to 12 μm, and a specific surface area of the talc is 4 to 12 m$^2$/g.

6. The composition according to claim 4, wherein
 a particle size of the talc is 1 to 12 μm, and a specific surface area of the talc is 4 to 12 m$^2$/g.
 7. A threaded connection for pipe or tube comprising a pin and a box, wherein
 each of the pin and the box comprises a contact surface including a mutually contacting portion, and the threaded connection for pipe or tube comprises a solid lubricating coating on the contact surface of at least one of the pin and the box;
 the solid lubricating coating comprises:
 a binder,
 a fluorine addition agent,
 a solid lubricant, and
 a rust proof addition agent;
 the binder comprises:
 an ethylene-vinyl acetate resin,
 a polyolefin resin, and
 a wax having a fusing point of 110° C. or less;
 a ratio of a mass of the ethylene-vinyl acetate resin to a mass of the polyolefin resin is from 1.0 to 1.8; and
 a ratio of a total mass of the polyolefin resin and the ethylene-vinyl acetate resin to a mass of the wax is from 0.7 to 1.6.
 8. The threaded connection for pipe or tube according to claim 7, wherein
 the solid lubricating coating comprises:
 60 to 80% by mass of the binder,
 8 to 18% by mass of the fluorine addition agent,
 5 to 15% by mass of the solid lubricant, and
 2 to 10% by mass of the rust proof addition agent.
 9. The threaded connection for pipe or tube according to claim 7, wherein
 the solid lubricating coating further comprises 2 to 15% by mass of talc.
 10. The threaded connection for pipe or tube according to claim 8, wherein
 the solid lubricating coating further comprises 2 to 15% by mass of talc.
 11. The threaded connection for pipe or tube according to claim 9, wherein
 a particle size of the talc is 1 to 12 μm, and a specific surface area of the talc is 4 to 12 m$^2$/g.
 12. The threaded connection for pipe or tube according to claim 10, wherein
 a particle size of the talc is 1 to 12 μm, and a specific surface area of the talc is 4 to 12 m$^2$/g.
 13. The threaded connection for pipe or tube according to claim 7, further comprising:
 a solid anticorrosive coating comprising an ultraviolet curing resin, wherein
 the solid lubricating coating is formed on the contact surface of one of the pin and the box, and the solid anticorrosive coating is formed on the contact surface of the other of the pin and the box.
 14. The threaded connection for pipe or tube according to claim 8, further comprising:
 a solid anticorrosive coating comprising an ultraviolet curing resin, wherein
 the solid lubricating coating is formed on the contact surface of one of the pin and the box, and the solid anticorrosive coating is formed on the contact surface of the other of the pin and the box.
 15. The threaded connection for pipe or tube according to claim 9, further comprising:
 a solid anticorrosive coating comprising an ultraviolet curing resin, wherein the solid lubricating coating is formed on the contact surface of one of the pin and the box, and the solid anticorrosive coating is formed on the contact surface of the other of the pin and the box.

16. The threaded connection for pipe or tube according to claim 10, further comprising:
a solid anticorrosive coating comprising an ultraviolet curing resin, wherein
the solid lubricating coating is formed on the contact surface of one of the pin and the box, and the solid anticorrosive coating is formed on the contact surface of the other of the pin and the box.

17. The threaded connection for pipe or tube according to claim 11, further comprising:
a solid anticorrosive coating comprising an ultraviolet curing resin, wherein
the solid lubricating coating is formed on the contact surface of one of the pin and the box, and the solid anticorrosive coating is formed on the contact surface of the other of the pin and the box.

18. The threaded connection for pipe or tube according to claim 12, further comprising:
a solid anticorrosive coating comprising an ultraviolet curing resin, wherein
the solid lubricating coating is formed on the contact surface of one of the pin and the box, and the solid anticorrosive coating is formed on the contact surface of the other of the pin and the box.

19. The threaded connection for pipe or tube according to claim 13, wherein
a thickness of the solid anticorrosive coating is 5 to 50 µm.

20. The threaded connection for pipe or tube according to claim 7, wherein
a thickness of the solid lubricating coating is 10 to 200 µm.

21. The threaded connection for pipe or tube according to claim 7, wherein
the threaded connection for pipe or tube is used for an oil well pipe.

22. A method of producing a threaded connection for pipe or tube comprising a pin and a box, each of the pin and the box comprising a contact surface including a mutually contacting portion, the threaded connection for pipe or tube further comprising a solid lubricating coating on the contact surface of at least one of the pin and the box, the method comprising:
a step of applying a composition according to claim 1 onto the contact surface to form the solid lubricating coating on the contact surface.

23. The method of producing a threaded connection for pipe or tube according to claim 22, wherein
in the step of forming the solid lubricating coating, forming the solid lubricating coating on the contact surface of one of the pin and the box,
the method further comprising:
a step of applying a composition for a solid anticorrosive coating including a ultraviolet curing resin onto the contact surface of the other of the pin and the box, and
a step of irradiating ultraviolet rays onto the composition for the solid anticorrosive coating that is applied to form the solid anticorrosive coating.

* * * * *

UNITED STATES PATENT AND TRADEMARK OFFICE
CERTIFICATE OF CORRECTION

PATENT NO. : 10,336,962 B2  
APPLICATION NO. : 15/126015  
DATED : July 2, 2019  
INVENTOR(S) : Goto Page 1 of 1

It is certified that error appears in the above-identified patent and that said Letters Patent is hereby corrected as shown below:

In the Claims

Column 45, Line 41:
"on a threaded connection for pipe or tube, by comprising:"
Should read:
"on a threaded connection for pipe or tube, comprising:"

Signed and Sealed this
Twenty-fifth Day of February, 2020

Andrei Iancu
*Director of the United States Patent and Trademark Office*